(12) United States Patent
Buerger et al.

(10) Patent No.: US 10,816,115 B2
(45) Date of Patent: Oct. 27, 2020

(54) CAPILLARY CONNECTION SYSTEM

(71) Applicant: DIONEX SOFTRON GMBH, Germering (DE)

(72) Inventors: Daniel Buerger, Raisting (DE); Adolf Satzinger, Olching (DE)

(73) Assignee: Dionex Softron GmbH, Germering (DE)

( * ) Notice: Subject to any disclaimer, the term of this patent is extended or adjusted under 35 U.S.C. 154(b) by 491 days.

(21) Appl. No.: 15/621,516

(22) Filed: Jun. 13, 2017

(65) Prior Publication Data

US 2017/0356575 A1 Dec. 14, 2017

(30) Foreign Application Priority Data

Jun. 13, 2016 (EP) ..................... 16174200

(51) Int. Cl.
*B01D 15/22* (2006.01)
*F16L 19/00* (2006.01)
(Continued)

(52) U.S. Cl.
CPC .............. *F16L 19/00* (2013.01); *B01D 15/22* (2013.01); *F16L 21/02* (2013.01); *F16L 21/04* (2013.01); *G01N 30/6004* (2013.01); *G01N 30/6026* (2013.01); *G01N 30/6034* (2013.01); *G01N 30/02* (2013.01); *G01N 30/60* (2013.01); *G01N 2030/027* (2013.01)

(58) Field of Classification Search
CPC ........ G01N 30/02; G01N 30/16; G01N 30/26; G01N 30/461; G01N 30/60; G01N 30/6004; G01N 30/6026; G01N 30/6034; G01N 30/6039; G01N 30/6043; G01N 2030/027; B01D 15/22; F16L 19/00; F16L 21/02; F16L 21/04
See application file for complete search history.

(56) References Cited

U.S. PATENT DOCUMENTS 6,095,572 A * 8/2000 Ford .................. G01N 30/6039
285/361
6,162,362 A * 12/2000 Ma ........................ B01D 15/22
210/198.2
(Continued)

FOREIGN PATENT DOCUMENTS

CN 201096248 Y 8/2008
CN 201155643 Y 11/2008
(Continued)

OTHER PUBLICATIONS

Extended European Search Report for Application No. 16174200.2, dated Sep. 13, 2016, 8 pages.

*Primary Examiner* — Benjamin L Lebron

(57) ABSTRACT

A socket unit for a capillary connection system, especially for use in HPLC applications, includes a housing with a housing outer surface and a housing inner surface that define a housing axial cavity. The socket unit also includes a socket connecting mechanism adapted to engage with a corresponding plug connecting mechanism of a plug unit to connect the plug unit and the socket unit together, wherein the socket connecting mechanism is adapted for a predetermined number of discrete connection states between the socket unit and the plug unit.

48 Claims, 15 Drawing Sheets

(51) Int. Cl.
  *F16L 21/02* (2006.01)
  *F16L 21/04* (2006.01)
  *G01N 30/02* (2006.01)
  *G01N 30/60* (2006.01)

(56) References Cited

U.S. PATENT DOCUMENTS

| | | |
|---|---|---|
| 7,125,489 B2 | 10/2006 | Zelechonok et al. |
| 2005/0199540 A1 | 9/2005 | Zelechonok et al. |
| 2012/0061955 A1 | 3/2012 | Hochgraeber et al. |
| 2012/0223522 A1 | 9/2012 | Graham |
| 2014/0260534 A1 | 9/2014 | Hahn et al. |
| 2014/0260564 A1 | 9/2014 | Beemer |
| 2016/0061789 A1 | 3/2016 | Hochgraeber et al. |

FOREIGN PATENT DOCUMENTS

| | | |
|---|---|---|
| CN | 101631929 A | 1/2010 |
| CN | 203797206 U | 8/2014 |
| EP | 1214160 B1 | 3/2005 |
| EP | 2730919 A1 | 5/2014 |
| GB | 2379487 A | 3/2003 |
| WO | WO2012148793 A1 | 11/2012 |

\* cited by examiner

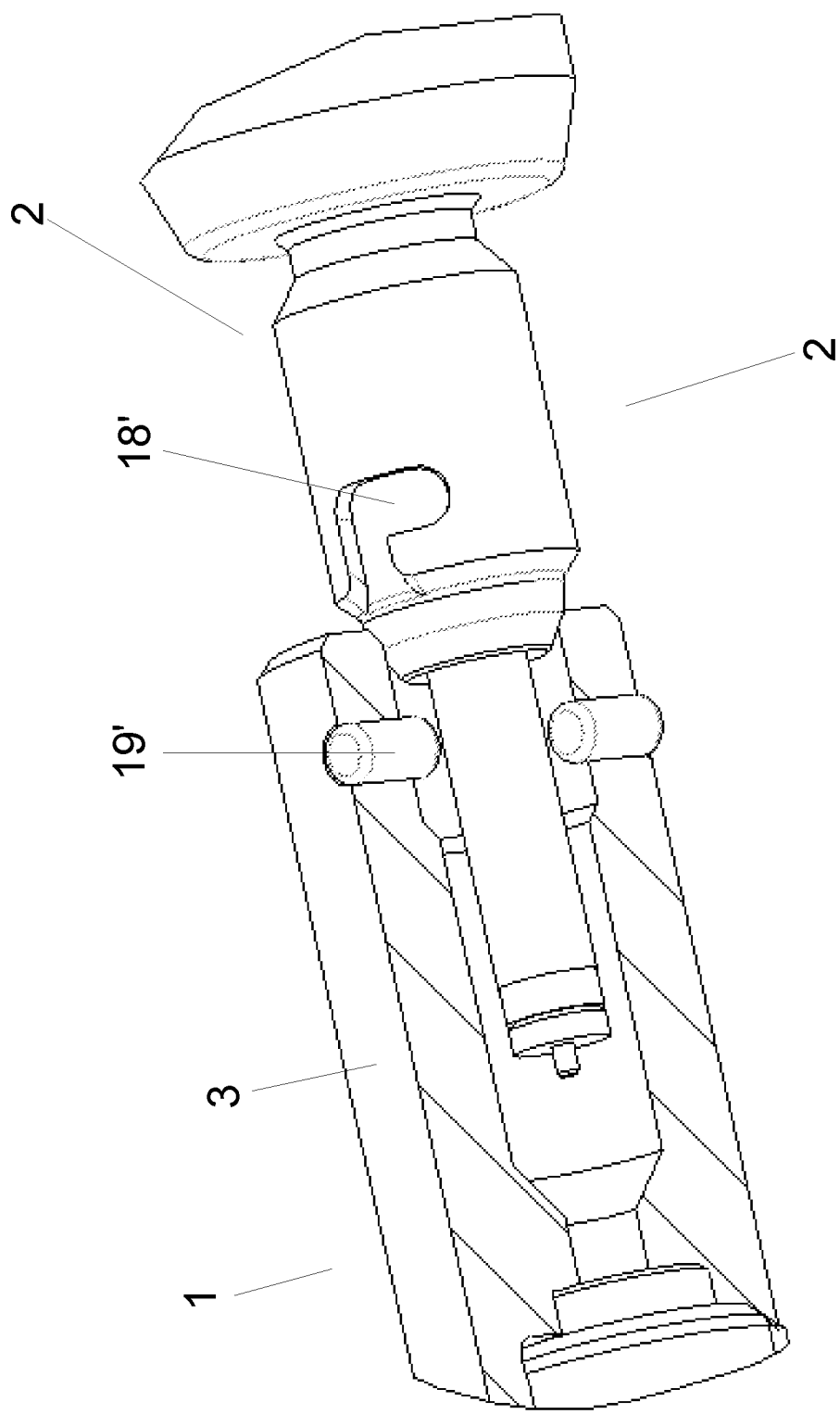

CAPILLARY CONNECTION SYSTEM

CROSS-REFERENCE TO RELATED APPLICATION

This application claims the priority benefit under 35 U.S.C. § 119 to European Patent Application No. 16174200.2 by inventors Daniel Buerger and Adolf Satzinger for "Capillary Connection System," filed on Jun. 13, 2016, the disclosure of which is incorporated herein by reference.

FIELD

The present invention generally relates to the connection of a capillary to another apparatus. More particularly, the present invention relates to a socket unit, a plug unit, a connector, a sealing inlay and an adaptor for the connection of a capillary. Embodiments of the present invention relate to the field of high-performance liquid chromatography (HPLC).

INTRODUCTION

High-performance liquid chromatography (HPLC) is a method used to separate samples into their constituent parts. It is used in pharmacological manufacturing, medical testing, research and other areas. The main idea comprises a sample passing through a column filled with a granular material. The sample's constituents interact with the material differently and therefore emerge at different speeds. They can then be detected separately. A HPLC device comprises multiple parts that must be connected with each other. This is often done using capillaries made from glass (fused silica), stainless steel, or PEEK (Poly-ether-ether-ketone, a chemically resistant, biocompatible, stable, strong and flexible material). For biocompatible HPLC systems, titanium, fused silica, MP35N™ or PEEK™ capillaries may be used. In some instances, iron may be avoided in such systems, as it can react with the fluids being tested. To connect such capillaries within a HPLC device, appropriate connectors are needed.

The connectors or connecting lines should have special devices at their end to ensure a tight connection. Those special devices are also called fittings. In some currently used fittings, a ferrule is squeezed against a conical cross-section thereby sealing the ferrule radially outwards and inwards towards the capillary tube. To achieve a tight seal, the connector must be screwed in and tightened with a force of several Newton. Using this technique, one cannot determine exactly when the screwed connection is reliably tight. Furthermore, there is a risk of damaging the fitting due to the large torque applied to it.

Currently used connectors often use a ferrule to securely and tightly attach the capillaries. The ferrule can also be cold-welded to the fitting connectors' bores, in particular if steel or stainless steel components are used. The capillary is then firmly attached within the bore.

In the prior art, there is also known a solution making use of a pull out ferrule. Such a prior art embodiment is depicted in FIG. 13. Shortly summarized, this FIG. 13 depicts a prior art connection system including a socket unit 1' and a plug unit 2', which can be connected to each other by means of a screw mechanism. The plug unit 2' houses a section of a capillary 13'. The plug unit 2' includes a pushing element 9' and a gripping element 7'. The gripping element 7' is connected to the capillary 13' by means of a pull out ferrule 75'. When unscrewing the plug unit 2' within such a solution, the gripping element 7' presses against the pull out ferrule 75' and pulls the capillary 13' from the cavity. The problem in such an embodiment is the use of the pull out ferrule. When detaching the capillary, it is pulled. This can lead to stretching, in particular for softer capillaries pulled out of tighter seals.

US 2012/0223522 A1 describes a fitting assembly having a nut and a self-releasing ferrule, which in certain embodiments may be assembled by an operator. The fitting assembly includes a nut with a first end, and a second end that defines a slot, and a ferrule with a first end that defines one or more slots, and a second end, with the second end of the nut adapted to receive the first end of the ferrule, the second end of the ferrule adapted to be received in a component or fitting of a liquid chromatography system. The nut and ferrule of the fitting assembly have passageways therethrough for receiving and removably holding tubing.

The ferrule described includes one or more slots, which can be complex to produce. Further, the holding force and/or the withdrawal force depend on the external diameter of the capillary tube.

Current developments in chromatography lead to smaller and smaller sample volumes used for testing. Together with the increase in the pressure during operation, this leads to shorter analysis times. This in turn implies that difficult to traverse areas and dead volume in the connections between the components of HPLC devices lead to more and more disruptive effects. Currently, the operation of HPLC devices is based on permanent deformations of the ferrules and capillaries in the sealing area. Once mounted, connection of this type cannot simply be disconnected and screwed in again without losses in analytical qualities of the ensuing connection.

U.S. Pat. No. 7,125,489 describes a HPLC column formed with overlying concentric inner and outer tubes. The flow path is established via the inner tube bore that holds packed absorbent, end filters and capping sealing members, and end coupling members cooperate with the inner tube at its ends. The sealing and end coupling members have conventional configurations for establishing a sealed connection with capillary lines and their fittings, for the series flow testing use through the column. The method and manner of assembly provides that the outer tube overlies all of the inner tube and both sealing members, but only part of each end coupling member. The ends of the outer tube are then deformed radially inward to become mechanically interlocked with the end coupling members, as the column, holding also the filters and sealing members within the inner tube.

The sealing surface here is not the end face of the socket, but the conical surface at the socket. Therefore, the capillary abuts bluntly on the end face, but does not remain sealed at high pressures.

EP 2 730 919 A1 discloses a fluidic connection system that may comprise a port which includes a capillary tube receptacle with an end seal face and a threaded wall. The fluidic connection system may also comprise a capillary tube that includes a front end face for sealingly abutting against the end seal face of the port. On the capillary tube, a flange may be affixed at a distance from the front end face of the capillary tube. The fluidic connection system may further comprise a fitting nut that includes an axial hole to allow the capillary tube to pass therethrough and a matching threaded wall corresponding to the threaded wall of the port. The fitting nut may be slidably coupled with the capillary tube behind the flange. The distance at which the flange is affixed may be predetermined such that when the flange is pushed forward by the fitting nut, the front end face of the capillary tube abuts directly against the end seal face of the port.

For this to work, all of the parts must be exactly fitted to each other and cannot comprise variable lengths.

US 2014/0260534 A1 describes a biocompatible filter for use in liquid chromatography systems such as HPLC or UHPLC. The disclosure addresses the problem of particles bypassing a filter in a liquid chromatography application by design features in the interface between the frit filter and ring that form an improved seal between the ring and frit and prevent leakage around the filter in high measure chromatography. Design features also include frit filters with an internal particle size gradient for pre-column separation activity during filtration.

US 2014/0260564 A1 discloses a connector with a biocompatible fluid passageway and method for manufacturing thereof. The biocompatible connector may be used in an analytical instrument (AI) system as a union, an adapter, a tee, a cross, a manifold, a valve, or for other fittings or components. The connector has a reinforcement insert and a biocompatible molding covering portions of the reinforcement insert. The reinforcement insert has a first portion, a second portion, and a middle portion between the first portion and the second portion. The first and second portions have threaded sections and each have a plurality of non-threaded sections. For a given portion, the junction of the non-threaded sections forms a lip by which to prevent the molded material from flowing into the threaded sections. In certain embodiments, an interior web is used in the reinforcement insert to provide additional structural support.

Producing such small-diameter tubes is cumbersome, given the need to work with an additional molded inner tube.

It is therefore an object of the present invention to overcome or at least alleviate the shortcomings and disadvantages of the prior art. In particular, it is therefore the object of the present invention to disclose a reliable high pressure appropriate tight connection to be realized by a preset sealing force applied without the use of tools. It is a further object of the present invention to provide an easy to use plug & play finger-tight connection or fitting. It is a further object to provide a reliable and more fail safe capillary connection mechanism. Additional objects pertain to further improvements as regards the fluid tight connection of capillaries, particularly in a HPLC system.

Further, it is an object of the present invention to disclose a fitting providing an easy release of the capillary from the fitting connector boreholes.

Even further, it is an object of the present invention to disclose a sealing of capillary connections having a reduced dead volume, such as being at least substantially free of a dead volume.

SUMMARY

In a first embodiment, the invention relates to a socket unit. The socket unit is adapted to be used for a capillary connection system, especially for use in HPLC applications. The socket unit comprises a housing comprising a housing outer surface and a housing inner surface defining a housing axial cavity. The socket unit also comprises a socket connecting mechanism adapted to engage with a corresponding plug connecting mechanism of a plug unit to connect the plug unit and the socket unit together.

In a second embodiment, the invention relates to a plug unit. The plug unit is adapted to be used for a capillary connection system, especially for use in HPLC applications. The plug unit comprises a capillary and a gripping element comprising a plug connecting mechanism adapted to engage with a corresponding socket connecting mechanism of a socket unit to connect the plug unit and the socket unit together.

In a third embodiment, the invention relates to an adaptor for a socket unit. The adaptor is adapted to be used for capillary connection, in particular for use in HPLC applications. The adaptor comprises an adaptor housing adapted to fixedly connect with a housing of the socket unit. The adaptor also comprises an adaptor connecting mechanism adapted to engage with a corresponding plug connecting mechanism of a plug unit to connect the plug unit and the adaptor together.

In a fourth embodiment, the invention relates to a sealing inlay piece. The sealing inlay piece is adapted to be fitted to a housing and to connect a capillary to another apparatus. The sealing inlay piece is adapted to fit around the capillary or against its face side to form a tight and secure seal. The sealing inlay piece comprises an inlay cavity through the sealing inlay piece adapted to serve as a passage for fluid flow.

In a fifth embodiment, the invention relates to a system for connection of a capillary comprising a socket unit and a plug unit as herein discussed.

In a sixth embodiment, the invention comprises a system for connection of a capillary. The system comprises an adaptor unit and a plug unit as discussed herein.

In some embodiments, the socket connecting mechanism can be adapted for a predetermined number of discrete connection states between the socket unit and the plug unit. This can for example mean that the socket connecting mechanism can comprise an "open" or "disconnected" state and one or more "closed" or "connected" states. The socket connecting mechanism as disclosed is adapted to function without a thread. This is advantageous, as previously known capillary connection systems relied on a thread to provide at least the holding force between the plug unit and the socket unit. In such systems, it was hard to precisely control the force applied to the system and to prevent breakage of various components due to excessive force during screwing. In such systems special tool use may have been required to connect and disconnect the plug and socket unit. The present invention seeks to eliminate these difficulties by relying on a connecting mechanism independent of a thread. In other words, having a predetermined number of discrete connection states (instead of, e.g., a threaded connection), the connection states may be defined as regards the relative positioning of the socket unit and the plug unit and the force of such a connection, thereby providing connection states, which are sufficiently strong and reliable, and, which, at the same time, lower the risk of material breakage due to excessive forces supplied to the connection.

In some embodiments disclosed herein, the socket connecting mechanism can be a snap fit connecting mechanism or a bayonet connecting mechanism. Both of those mechanisms can be adapted to be secured or closed or connected without the use of special tools (i.e. simply by hand) and to apply a precise holding force on the system.

The socket connecting mechanism can comprise at least one socket connecting element. The socket connecting element(s) can be placed at least partially around a longitudinal axis of the socket unit. This can mean that the socket connecting element is placed all the way around the longitudinal axis of the socket unit or that the socket connecting element is placed at a specific location on the socket unit. This can also mean that a plurality of socket connecting elements are placed around the longitudinal axis of the socket unit. In some embodiments, there are 1, 2, 3, 4, 5, 6, 7, 8 or more socket connecting elements distributed around the longitudinal axis of the socket unit.

The socket connecting elements can comprise a socket indentation comprising a narrowing of the inner diameter from the housing outer surface towards the housing inner surface; and a snapping element adapted to fit into the socket indentation from the outer surface of the housing. The socket indentation can comprise, for example, a borehole, which also applies to other indentations discussed in this specification. The snapping elements can comprise for example balls, preferably with a diameter of about 1 to 2 mm, such as about 1.5 mm. However, the snapping elements can also comprise pins adapted to act as a lateral lever. In general, the snapping elements can comprise protrusions of an arbitrary shape. For example, the snapping elements can comprise a ring going around the longitudinal axis of the housing. Such a ring can be for example made of metal, such as steel, and/or stainless steel, and/or aluminum. In some embodiments, such a ring can be deformable. In such embodiments, the ring could be deformed during connecting of the plug unit and the socket unit. The holding element can comprise for example a snap ring.

The socket connecting mechanism can further comprise at least one holding element adapted to fix at least one snapping element within the socket indentation on the housing from the side of the housing outer surface. In some embodiments, two holding elements are provided—one on each side of the snapping element.

The socket unit can further comprise a sealing inlay piece (which may also be referred to as a union inlay piece) adapted to seal the capillary and to fluidly connect it to other elements (such as other capillaries, the chromatography column or other elements).

In embodiments comprising the socket connecting elements, the socket unit can further comprise a sealing surface adapted to seal a front end of a capillary, said sealing surface being perpendicular, radial or conically oriented with respect to the longitudinal axis of the socket unit and wherein said sealing surface is longitudinally displaced from the socket connecting elements by a distance in the range of 5 to 15 mm, more preferably 7 to 13 mm, even more preferably 9 to 10 mm. Such a separation is advantageous, as it can optimize the stability and durability of the system.

In some embodiments, the socket unit can further comprise an abutment on the inner surface of the housing adapted to stop the advancement of the plug unit during the connection process. Such an abutment or "stop" can be useful to ensure that the plug unit does not advance too far and break or damage the capillary or other components as a result of such advancement.

The plug connecting mechanism of the plug unit can similarly to the socket connecting mechanism be adapted for a predetermined number of discrete connection states between the socket unit and the plug unit. Such states can be as described above.

Also similarly to the socket unit, the plug unit does not have to comprise a thread assuring an easy tool free connection. According to some embodiments, the plug connecting mechanism is adapted for a predetermined number of discrete connection states between the socket unit and the plug unit. This may lead to the same advantages as described above with respect to the socket unit.

The plug connecting mechanism can also comprise a snap fit connecting mechanism or a bayonet connecting mechanism. The plug connecting mechanism can comprise at least one plug connecting element. Such plug connecting element can comprise a plug indentation, e.g., a groove running around an outer circumference of the gripping element. The plug connecting elements can be a plurality of plug connecting elements distributed around a longitudinal axis of the plug unit. In such embodiments, the plug connecting elements can comprise recesses or indentations. The plug connecting mechanism can also comprise a bayonet mount located on the gripping element and adapted to connect with the socket connecting mechanism, i.e. for example with corresponding protrusions on the socket unit.

Note that a skilled person will understand that the opposite arrangement of connecting elements is also possible in some embodiments. That is, in some embodiments, the socket connecting element comprises a groove, an indentation, or a recess (respectively a bayonet mount) that is adapted to connect with a corresponding plug connecting element comprising protrusion or protrusions comprising for example balls, pins or differently shaped elements. Everything mentioned about some possible embodiments of the plug connecting element and the socket connecting element could apply in reverse, i.e. to the socket connecting element and the plug connecting element respectively in such embodiments.

The plug unit can further comprise a pushing element fixed to the capillary and adapted to transmit an axial sealing force to the capillary, wherein the gripping element grips the pushing element. Such a pushing element could for example replace a ferrule used in previously known capillary connections. The plug unit could further comprise an interlayer or jacket layer placed around the capillary between the capillary and the pushing element. This interlayer can serve to protect the capillary from breakage due to radial force, particularly from crimping.

The plug unit can also comprise a biasing element adapted to at least apply an axial sealing force on the pushing element. Such a biasing element could regulate and modulate the sealing force. Such a biasing element could help modulate the tolerances of the system, in particular in the connection between the pushing element and the gripping element. Such a biasing element could comprise a compression spring. In other embodiments the biasing element could comprise at least one Belleville washer. The biasing element could have a spring constant between 1 N/mm to 20 N/mm, more preferably 5 N/mm to 15 N/mm, even more preferably around 8-12 N/mm.

In some embodiments, the gripping element can comprise a forward end that is curved inward, i.e., an end that is bent in on itself towards an axial cavity of the gripping element and defines an end cavity. This end will also be referred to as the "curved inward end". In embodiments of the plug unit comprising a pushing element, the pushing element can further comprise at least one shoulder adapted to fit within the end cavity of the gripping element and to engage with the curved inward end of the gripping element. Such an engagement between the curved inward end of the gripping element and the shoulder of the pushing element can be adapted to withstand a separating force of 100 N, more preferably about 500 N, even more preferably about 1000 N, that is an axial force supplied to one of the gripping element and the pushing element, while the other element has a fixed position.

In some embodiments, comprising the forward curved end of the gripping element, the plug unit can further comprise a pushing element, wherein the pushing element can comprise at least one shoulder adapted to fit within the end cavity of the gripping element and to engage with the curved inward end of the gripping element. Such an engagement could also be adapted to withstand a separating force of 100 N, more preferably about 500 N, even more preferably about 1000 N.

Note that the curved end of the gripping element presents one more advantage to the capillary connecting system. When using the plug unit comprising such a curved end, a pull out ferrule is not necessary. In previously known capillary connectors, as mentioned in the introduction and discussed in conjunction with FIG. 13, there was a problem as regards the disconnection of the plug unit and the socket unit. Typically, the gripping element was not firmly connected to the pushing element in such a way that the pushing element was pulled out together with the gripping element, when the gripping element was pulled out, i.e., disconnected from the from socket unit. Instead, there was provided an additional pull out ferrule firmly connecting the gripping element to the capillary. That could lead to the disconnecting force being applied to the capillary during disconnection and to capillary breakage. As stated, a pull out ferrule was typically used to firmly connect the gripping element to the capillary. Such a pull out ferrule was typically located further backward than the most forward section of the gripping element (the most forward section being the section being first inserted into the socket unit when inserting the gripping element into the socket unit and thus defining forward and backward directions). Thus, the gripping element was firmly connected to the capillary at a location displaced from the pushing element. As discussed, in previous connection systems, the sealing element and thus also the pushing element may tend to be fixed in the socket unit. When disconnecting the plug unit from the socket unit, this could lead to a forward section of the capillary being fixed in the socket unit, while there was a firm connection between the gripping element and the capillary at a more backward location, where the pull out ferrule is provided. This may lead to an axial force being supplied to the capillary upon disconnection of the plug unit from the socket unit, potentially lengthening and/or damaging the capillary. With the curved end connection between the gripping element and the pushing element (which pushing element in turn is connected firmly to the capillary), one may ensure that during disconnection, the capillary along with the pushing element gets out and does not remain within the housing of the socket unit with less risk of damaging and/or lengthening of the capillary. It could be placed around the capillary within the gripping element and would serve to apply an axial disconnecting force to the capillary when disconnecting the plug unit and the socket unit. The present invention may therefore omit the pull out ferrule, as the curved end of the gripping element grips the pushing element and ensures that it comes out of the housing of the socket unit during disconnection.

The plug unit can further comprise a forward end wherein such forward end can be longitudinally displaced from the at least one plug connecting element by a distance in the range of 5 to 15 mm, more preferably 7 to 13 mm, even more preferably 9 to 10 mm, leading to a particularly stable connection between the plug unit and the socket unit, while at the same time allowing for a safe and reliable seal.

The plug unit can further comprise a sealing or protecting element having a sealing surface perpendicular to a longitudinal axis of the plug unit, the sealing element adapted to create a seal between the plug unit and the socket unit by means of its sealing surface. The sealing element can further be adapted to protect, stabilize and/or center the capillary during connection and disconnection of the plug unit and the socket unit.

In some embodiments, the socket unit can be implemented as an adaptor to retrofit existing socket units. In such embodiments, the adaptor can comprise an adaptor connecting mechanism adapted to connect with the plug unit. In such embodiments, the adaptor connecting mechanism can be adapted for a predetermined number of discrete connection states between the adaptor and the plug unit. In such embodiments, the adaptor connecting mechanism does not necessarily comprise a thread, allowing for a snap fit or a bayonet connecting mechanism. The adaptor connecting mechanism can comprise at least one adaptor connecting element placed at least partially around a longitudinal axis of the adaptor. In some embodiments, there are 1, 2, 3, 4, 5, 6, 7, 8, or more adaptor connecting elements distributed around the longitudinal axis of the adaptor. The adaptor connecting element can comprise an adaptor indentation comprising a narrowing of the inner diameter from an outer surface of the adaptor housing towards an inner surface of the adaptor housing; and a snapping element adapted to fit into the adaptor indentations from the outer surface of the adaptor housing. The adaptor indentation can comprise, for example, a borehole. The adaptor connecting element can also comprise a bayonet connection. The adaptor connecting mechanism can further comprise at least one holding element adapted to fix at least one snapping element within the adaptor indentation on the adaptor housing from the side of the adaptor housing outer surface. In embodiments comprising the snapping elements, they can comprise balls, preferably with a diameter of 1 to 2 mm, such as about 1.5 mm. The snapping elements can also comprise pins adapted to act as a lateral lever. Generally, the snapping elements can comprise any protruding shapes. The holding element can comprise a snap ring. The adaptor unit can further comprise a sealing surface adapted to seal a front end of a capillary, said sealing surface being perpendicular, radial or conically oriented to the longitudinal axis of the adaptor and wherein said sealing surface can be longitudinally displaced from the adaptor connecting elements by a distance in the range of 5 to 15 mm, more preferably 7 to 13 mm, even more preferably 9 to 10 mm.

Note that like in the case of the socket unit, the adaptor connecting element can instead comprise a recess, groove or an indentation running around the adaptor housing with the protruding connecting element being part of the plug unit.

A skilled person will also understand that all discussion relating to the socket unit can just as well relate to the adaptor unit. As such, all features and advantages discussed above in the context of the socket unit apply to the adaptor unit as well.

As previously mentioned, the socket unit can comprise a sealing or union inlay piece. Such a piece can also be separately attached to the system, i.e. for example fitted to a housing. Such sealing inlay piece can comprise at least one indentation within the sealing inlay piece adapted to fit the end of a capillary. In such embodiments, the end of the capillary fitting the indentation can comprise a length of 0.3-0.6 mm, more preferably 0.4-0.5 mm, such as about 450 µm. However, in other embodiments, the sealing inlay piece comprises no indentation and the capillary abuts head on against the sealing inlay piece. The sealing inlay piece or union inlay piece can be made out of a soft and dense material, preferably out of PEEK. In some embodiments, the sealing inlay piece can comprise a metal core and a plastic coated surface, preferably a PEEK coated surface. The inlay cavity can comprise a diameter of 30-300 µm. The sealing area of the sealing inlay piece can be in the range of 0.05 mm$^2$ to 0.5 mm$^2$, more preferably 0.05 mm$^2$ to 0.15 mm$^2$, even more preferably around 0.1 mm$^2$. The sealing inlay piece can comprise a conductive material, such as conductive PEEK. This can be important if liquids passing through the sealing inlay piece are charged.

As discussed, in some embodiments, the sealing inlay piece can be part of the socket unit. In such embodiments it can comprise all the elements and possess all the features as described above. In embodiments where the plug unit comprises the sealing element, it can be adapted to provide sealing between the capillary and the sealing inlay piece.

The embodiments, elements and features as discussed can all form part of a plug and play capillary connection system. Such a system can, at the very basic level comprise a socket unit and a plug unit as discussed above. The socket connecting mechanism and the plug connecting mechanism can be adapted to assume a connection state and the plug unit and the socket unit can be adapted to withstand a disconnecting force of 3 N, more preferably 5 N, even more preferably 7 N, such as 9 N in the connection state. The plug and socket units can also be adapted to disconnect when a disconnecting force of 50 N, more preferably 20 N, more preferably 10 N is applied.

In embodiments where the plug unit comprises the biasing element, the biasing element can be adapted to increase the sealing force tolerance and to modulate the sealing force in the connection state of the system.

The holding force provided by the snap fit mechanism between the socket unit and the plug unit can be about 10 to 50 N, more preferably about 10 to 30 N, even more preferably around 20 N. A sealing or biasing force may be 5 N to 25 N, where the sealing or biasing force is smaller than the holding force. The mechanism may be adapted to withstand a disconnecting force which is smaller than or equal to the difference between the holding force and the sealing or biasing force, but not to withstand a disconnecting force which is greater than the difference between the holding force and the sealing or biasing force. Thus, the system may be adapted to withstand a separating force of, e.g., 5 N or 9 N, but not to withstand a separating force of, e.g., 30 N, 20 N or 10 N.

In other embodiments, the system for capillary connection can comprise an adaptor unit in accordance with any of the preceding adaptor embodiments; and a plug unit as described above and below. In such embodiments, the adaptor connecting mechanism and the plug connecting mechanism can be adapted to assume a connection state and the plug unit and the adaptor unit can be adapted to withstand a disconnecting force between the plug unit and the adaptor, without other units being present, of 10 N, more preferably 15 N, even more preferably 19 N in the connection state. The plug and adaptor units can also be adapted to separate when a disconnecting force of 50 N, more preferably 30 N, more preferably 20 N is applied. The holding force provided by the snap fit mechanism between the adaptor unit and the plug unit can be about 10 to 50 N, more preferably about 10 to 30 N, even more preferably around 20 N. In such an embodiment, where only the adaptor and the plug unit are considered for the disconnecting force, the disconnecting force required to disconnect the plug unit from the connector may be larger, as there is no biasing or sealing force in a system only comprising the adaptor and the plug unit.

The above described forces may be advantageous for simultaneously allowing a safe and secure connection and sealing, as well as a connection and disconnection of the units without the need of particular (or, in fact, any) tools.

Below, further numbered embodiments of the invention will be discussed.

Below, embodiments relating to a socket unit will be discussed. Such embodiments carry the letter "S" followed by a number. When reference is made to socket embodiments, such embodiments indicated by "S" followed by a number are meant.

S1. A socket unit (1) for a capillary connection system, especially for use in HPLC applications, said socket unit (1) comprising
 a. a housing (3) comprising a housing outer surface (32) and a housing inner surface (33) defining a housing axial cavity (31); and
 b. a socket connecting mechanism adapted to engage with a corresponding plug connecting mechanism of a plug unit (2) to connect the plug unit (2) and the socket unit (1) together.

S2. A socket unit (1) according to the preceding embodiment, wherein the socket connecting mechanism is adapted for a predetermined number of discrete connection states between the socket unit (1) and the plug unit (2).

S3. A socket unit (1) according to any of the preceding embodiments, wherein the socket connecting mechanism does not comprise a thread.

S4. A socket unit (1) according to any of the preceding embodiments, wherein the socket connecting mechanism is a snap fit connecting mechanism or a bayonet connecting mechanism.

S5. A socket unit (1) according to any of the preceding embodiments, wherein the socket connecting mechanism comprises at least one socket connecting element.

S6. A socket unit (1) according to the preceding embodiment, wherein there are 1, 2, 3, 4, 5, 6, 7, 8 or more socket connecting elements distributed around a longitudinal axis of the socket unit (1).

S7. A socket unit (1) according to any of the preceding embodiments with the features of embodiment S5, wherein each socket connecting element comprises
 a socket indentation (18) comprising a narrowing of the inner diameter from the housing outer surface (32) towards the housing inner surface (33); and
 a snapping element (19) adapted to fit into the socket indentation (18) from the outer surface of the housing (3).

S8. A socket unit (1) according to the preceding embodiment wherein the socket connecting mechanism further comprises
 at least one holding element (21) adapted to fix at least one snapping element (19) within the socket indentation (18) on the housing (3) from the side of the housing outer surface (32).

S9. A socket unit (1) according to any of the preceding embodiments with the features of embodiment S7 wherein the snapping elements (19) comprise balls, preferably with a diameter of about 1 to 2 mm, such as about 1.5 mm.

S10. A socket unit (1) according to embodiment S7 or S8 wherein the snapping elements (19) comprise pins adapted to act as a lateral lever.

S11. A socket unit (1) according to any of the preceding embodiments with the features of S8 wherein each holding element (21) comprises a snap ring.

S12. A socket unit (1) according to any of the preceding embodiments further comprising a sealing or union inlay piece (5) adapted to seal a capillary (13) and to fluidly connect it to other elements.

S13. A socket unit (1) according to any of the preceding embodiments with the features of embodiment S5, wherein the socket unit (1) comprises a sealing surface adapted to seal a front end of a capillary, said sealing surface being perpendicular to the longitudinal axis of the socket unit (1) and wherein said sealing surface is longitudinally displaced from the socket connecting elements by a distance in the range of 5 to 15 mm, more preferably 7 to 13 mm, even more preferably 9 to 10 mm.

S14. A socket unit (1) further comprising an abutment (34) on the inner surface of the housing (3) adapted to stop the advancement of the plug unit (2) during the connection process.

S15. A socket unit (1) according to any of the preceding embodiments with the features of embodiment S5 wherein the socket connecting element comprises at least an indentation, a recess or a groove (8) running around the inner circumference of the housing (3) adapted to fit with a corresponding protruding element of a plug unit (2) to assure a snap fit or a bayonet connection.

S16. A socket unit (1) according to any of the preceding embodiments with the features of embodiments S5, wherein each socket connecting element comprises a recess adapted to fit with a corresponding protruding element of a plug unit (2) to assure a snap fit or a bayonet connection.

Below, embodiments relating to a plug unit will be discussed. Such embodiments carry the letter "P" followed by a number. When reference is made to plug embodiments, such embodiments indicated by "P" followed by a number are meant.

P1. A plug unit (2) for a capillary connection system, especially for use in HPLC applications, said plug unit (2) comprising
  a. a capillary (13); and
  b. a gripping element (7) comprising a plug connecting mechanism adapted to engage with a corresponding socket connecting mechanism of a socket unit (1) to connect the plug unit (2) and the socket unit (1) together.

P2. A plug unit (1) according to the preceding embodiment, wherein the plug connecting mechanism is adapted for a predetermined number of discrete connection states between the socket unit (1) and the plug unit (2).

P3. A plug unit (1) according to any of the preceding plug embodiments, wherein the plug connecting mechanism does not comprise a thread.

P4. A plug unit (1) according to any of the preceding plug embodiments, wherein the plug connecting mechanism is a snap fit connecting mechanism or a bayonet connecting mechanism.

P5. A plug unit (1) according to any of the preceding plug embodiments, wherein the plug connecting mechanism comprises at least one plug connecting element.

P6. A plug unit (1) according to the preceding embodiment, wherein the plug connecting element is a plug indentation, such as a groove (8) around an outer circumference of the gripping element (7).

P7. A plug unit (1) according to the penultimate embodiment, wherein the plug connecting mechanism comprises plug connecting elements distributed around a longitudinal axis of the plug unit (2).

P8. A plug unit (1) according to the preceding embodiment, wherein each plug connecting element comprises a recess (8).

P9. A plug unit (2) according to any of the preceding plug embodiments further comprising a pushing element (9) fixed to the capillary (13) and adapted to transmit an axial sealing force to the capillary (13), wherein the gripping element (7) grips the pushing element (9).

P10. A plug unit (2) according to any of the preceding plug embodiments further comprising an interlayer or jacket layer (15) around the capillary (13).

P11. A plug unit (2) according to any of the preceding plug embodiments wherein the plug connecting mechanism comprises a bayonet mount located on the gripping element (7) and adapted to connect with the socket connecting mechanism.

P12. A plug unit (2) according to any of the preceding plug embodiments with the features of embodiment P9 further comprising a biasing element (17) adapted to at least apply an axial sealing force on the pushing element (9).

P13. A plug unit (2) according to the preceding embodiment wherein the biasing element (17) comprises a compression spring.

P14. A plug unit (2) according to the preceding embodiment wherein the biasing element (17) comprises a spring constant between 1 N/mm to 20 N/mm, more preferably 5 N/mm to 15 N/mm, even more preferably around 8-12 N/mm.

P15. A plug unit (2) according to the penultimate embodiment wherein the biasing element (17) comprises at least one Belleville washer.

P16. A plug unit (2) according to any of the preceding plug embodiments, wherein the gripping element (7) comprises a forward curved inward end (71) wherein the curved inward end (71) is bent in on itself towards an axial cavity of the gripping element (7) and defines an end cavity (72).

P17. A plug unit (2) according to the preceding embodiment with the features of embodiment P9, wherein the pushing element (9) further comprises at least one shoulder (91) adapted to fit within the end cavity (72) of the gripping element (7) and to engage with the curved inward end (71) of the gripping element (7).

P18. A plug unit (2) according to the preceding embodiment, wherein the engagement between the curved inward end (71) of the gripping element (7) and the shoulder (91) of the pushing element (9) is adapted to withstand a separating force of 100 N, more preferably 500 N, even more preferably 1000 N.

P19. A plug unit (2) according to any of the preceding plug embodiments with the features of embodiment P5, wherein the plug unit (2) comprises a forward end and wherein the forward end is longitudinally displaced from the at least one plug connecting element by a distance in the range of 5 to 15 mm, more preferably 7 to 13 mm, even more preferably 9 to 10 mm.

P20. A plug unit (2) according to any of the preceding plug embodiments, wherein the plug unit (2) further comprises a sealing or protecting element (11).

P21. A plug unit in accordance with the preceding embodiment, wherein the sealing or protecting element (11) has a sealing surface perpendicular to a longitudinal axis of the plug unit (2), wherein the sealing element (11) is adapted to create a seal between the plug unit (2) and the socket unit (1) by means of its sealing surface.

P22. A plug unit (2) according to any of the preceding two embodiments, wherein the sealing and protecting element (11) is adapted to protect and stabilize the capillary (13) during connection and disconnection of the plug unit (2) and socket unit (1).

P23. A plug unit (2) according to any of the preceding embodiments with the features of embodiment P5 wherein each plug connecting element comprises a snap fit element adapted to at least connect with the socket unit (1) in a snap fit connection or a bayonet connection element adapted to at least connect with the socket unit (1) in a bayonet connection.

P24. A plug unit (2) according to the preceding plug embodiments wherein each snap fit element comprises a protrusion (19) adapted to fit with a corresponding groove (8) on the socket unit to assure a snap fit connection.

Below, embodiments relating to an adaptor will be discussed. Such embodiments carry the letter "A" followed by a number. When reference is made to adaptor embodiments, such embodiments indicated by "A" followed by a number are meant.

A1. An adaptor for a socket unit (1) in particular for use in HPLC applications, said adaptor comprising
 a. an adaptor housing adapted to fixedly connect with a housing (3) of the socket unit (1); and
 b. an adaptor connecting mechanism adapted to engage with a corresponding plug connecting mechanism of a plug unit (2) to connect the plug unit (2) and the adaptor together.

A2. An adaptor according to the preceding embodiment, wherein the adaptor connecting mechanism is adapted for a predetermined number of discrete connection states between the adaptor and the plug unit (2).

A3. An adaptor according to any of the preceding adaptor embodiments, wherein the adaptor connecting mechanism does not comprise a thread.

A4. An adaptor according to any of the preceding adaptor embodiments, wherein the adaptor connecting mechanism is a snap fit connecting mechanism or a bayonet connecting mechanism.

A5. An adaptor according to any of the preceding adaptor embodiments, wherein the adaptor connecting mechanism comprises at least one adaptor connecting element.

A6. An adaptor according to the preceding adaptor embodiment, wherein there are 1, 2, 3, 4, 5, 6, 7, 8 or more adaptor connecting elements distributed around a longitudinal axis of the adaptor.

A7. An adaptor according to any of the preceding adaptor embodiments with the features of embodiment A5, wherein each adaptor connecting element comprises
 an adaptor indentation comprising a narrowing of the inner diameter from an outer surface of the adaptor housing towards an inner surface of the adaptor housing; and
 a snapping element adapted to fit into the adaptor indentation from the outer surface of the adaptor housing.

A8. An adaptor according to any of the preceding adaptor embodiments comprising the features of embodiment A5 wherein the adaptor connecting element comprises a bayonet connection.

A9. An adaptor according to the penultimate embodiment wherein the adaptor connecting mechanism further comprises
 at least one holding element adapted to fix at least one snapping element within the adaptor indentation on the adaptor housing from the side of the adaptor housing outer surface.

A10. An adaptor according to any of the preceding adaptor embodiments with the features of embodiment A7 wherein the snapping elements comprise balls, preferably with a diameter of 1-2 mm, such as about 1.5 mm.

A11. An adaptor according to embodiment A7 or A9 wherein the snapping elements comprise pins adapted to act as a lateral lever.

A12. An adaptor according to any of the preceding adaptor embodiments with the features of A9 wherein each holding element comprises a snap ring.

A13. An adaptor according to any of the preceding adaptor embodiments with the features of embodiment A5, wherein the socket unit (1) comprises a sealing surface adapted to seal a front end of a capillary, said sealing surface being perpendicular to the longitudinal axis of the socket unit (1) and wherein said sealing surface is longitudinally displaced from the adaptor connecting elements by a distance in the range of 5 to 15 mm, more preferably 7 to 13 mm, even more preferably 9 to 10 mm.

A14. An adaptor according to any of the preceding adaptor embodiments and comprising the features of embodiment A5 wherein the adaptor connecting element comprises at least a recess or a groove running around an inner circumference of an adaptor housing (3) adapted to fit with a corresponding protruding element of a plug unit (2) to assure a snap fit or a bayonet connection.

A15. An adapter according to any of the preceding embodiments with the features of embodiments A5, wherein each adaptor connecting element comprises a recess adapted to fit with a corresponding protruding element of a plug unit (2) to assure a snap fit or a bayonet connection.

Below, embodiments relating to a sealing inlay piece will be discussed. Such embodiments carry the letter "I" followed by a number. When reference is made to inlay embodiments, such embodiments indicated by "I" followed by a number are meant.

I1. A sealing inlay piece (5) adapted to be fitted to a housing (3) and to connect a capillary (13) to another apparatus, wherein the sealing inlay piece (5) is adapted to fit around the capillary (13) or flat against its face side to form a tight and secure seal, wherein the sealing inlay piece (5) comprises an inlay cavity (50) through the sealing inlay piece (5) adapted to serve as a passage for fluid flow.

I2. A sealing inlay piece (5) in accordance with the preceding embodiment, further comprising at least one indentation (51) within the sealing inlay piece (5) adapted to fit the end of capillary (13).

I3. A sealing inlay piece (5) according to the any of the preceding inlay embodiments wherein the sealing inlay piece (5) is made out of a soft and dense material, preferably PEEK.

I4. A sealing inlay piece (5) according to any of the embodiments 11 or 12 wherein the sealing inlay piece (5) comprises a metal core and a plastic coated surface, preferably PEEK coated surface.

I5. A sealing inlay piece (5) according to any of the preceding inlay embodiments wherein the inlay cavity (50) comprises a diameter of 30-300 μm.

I6. A sealing inlay piece (5) according to any of the preceding inlay embodiments wherein a sealing area of the sealing inlay piece (5) is in the range of 0.05 mm$^2$ to 0.5 mm$^2$, more preferably 0.05 mm$^2$ to 0.15 mm$^2$, even more preferably around 0.1 mm$^2$.

I7. A sealing inlay piece (5) according to any of the preceding inlay embodiments, wherein the inlay comprises a conductive material, such as conductive PEEK.

S17. A socket unit (1) according to any of the preceding socket embodiments, wherein the socket unit (1) comprises a sealing inlay piece (5) in accordance with any of the preceding inlay embodiments.

P25. A plug unit according to any of the preceding plug embodiments and comprising the features of embodiment P20 wherein the sealing or protecting element (11) is further adapted to provide sealing between the capillary (13) and the sealing inlay piece (5) according to any of the preceding inlay embodiments.

Below, embodiments relating to a system will be discussed. Such embodiments carry the letters "SY" followed by a number. When reference is made to system embodiments, such embodiments indicated by "SY" followed by a number are meant.

SY1. A system for connection of a capillary (13), the system comprising
- a socket unit (1) in accordance with any the preceding socket embodiments; and
- a plug unit (2) in accordance with any of the preceding plug embodiments.

SY2. A system in accordance with the preceding embodiment, wherein the socket connecting mechanism and the plug connecting mechanism are adapted to assume a connection state and the plug unit (2) and the socket unit (1) are adapted to withstand a disconnecting force of 3 N, more preferably 5 N, even more preferably 7 N, such as 9 N in the connection state.

SY3. A system in accordance with the preceding embodiment, wherein in the connection state, the plug unit (2) and the socket unit (1) are adapted to separate when a disconnecting force of 50 N, more preferably 25 N, more preferably 10 N is applied.

SY4. A system in accordance with any of the preceding system embodiments and with features of embodiment P12 wherein the biasing element (17) is adapted to increase sealing force tolerance and is further adapted to modulate the sealing force in the connection state of the system.

SY4. A system for connection of a capillary (13), the system comprising an adaptor unit in accordance with any of the preceding adaptor embodiments; and a plug unit (2) in accordance with any of the preceding plug embodiments.

SY5. A system in accordance with the preceding embodiment, wherein the adaptor connecting mechanism and the plug connecting mechanism are adapted to assume a connection state and the plug unit (2) and the adaptor are adapted to withstand a disconnecting force of 5 N, more preferably 10 N, even more preferably around 15 N, such as 19 N in the connection state.

SY6. A system in accordance with the preceding embodiment, wherein in the connection state, the plug unit (2) and the adaptor are adapted to separate when a separating force of 50 N, more preferably 30 N, more preferably 20 N is applied.

The present technology will now be discussed with reference to the accompanying drawings, which are exemplary only and which should not be construed to limit the scope of the present invention.

BRIEF DESCRIPTION OF THE DRAWINGS

FIGS. 12a, 12b, 12c depict an alternate embodiment of the fitting system according to the invention.

DETAILED DESCRIPTION OF EMBODIMENTS

Figure 1:
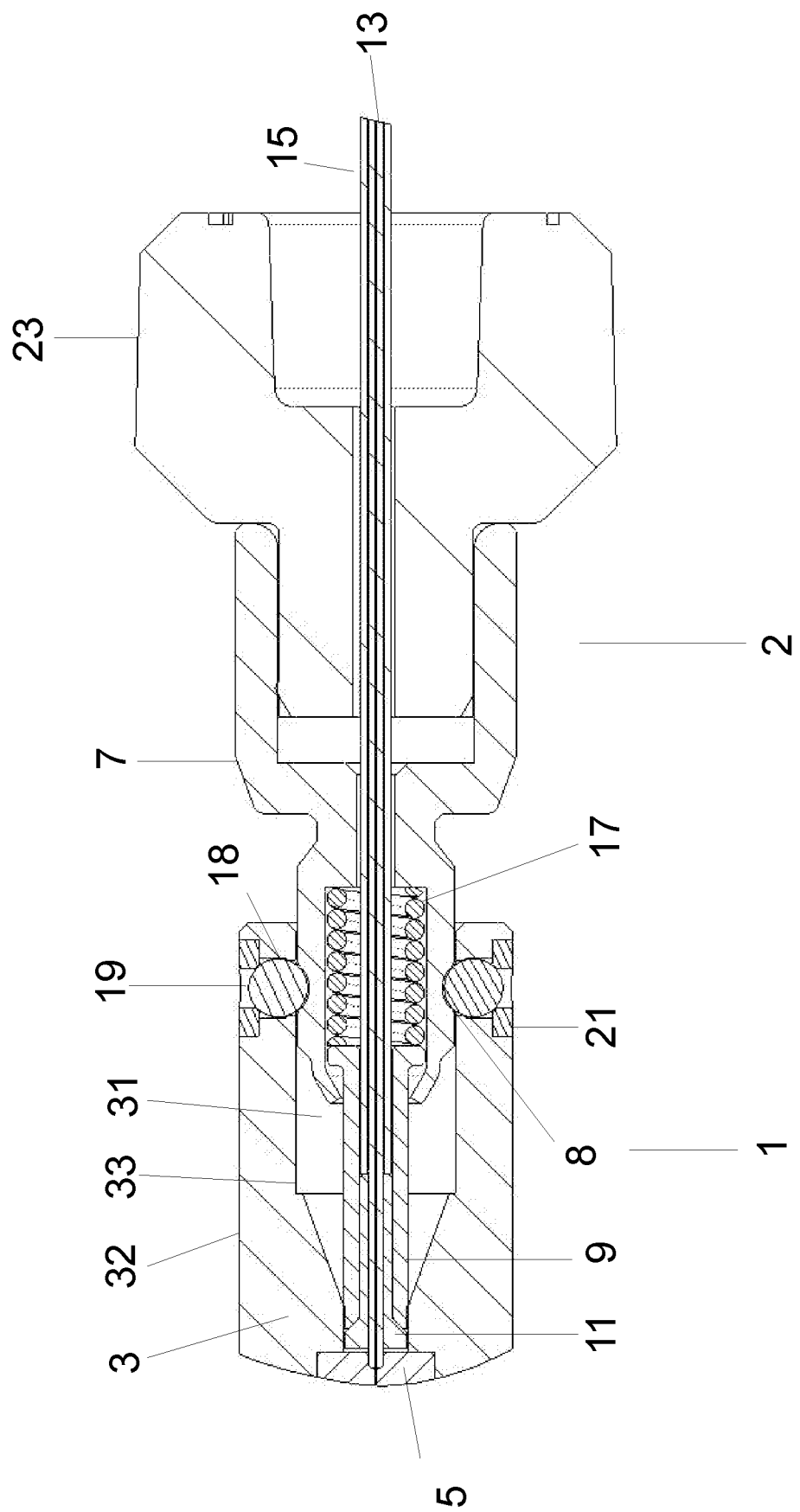
FIG. 1 depicts an embodiment of a fitting system according to one aspect of the invention.

FIG. 1 generally depicts a schematic embodiment of a fitting system or fitting assembly according to one aspect of the invention. The fitting assembly is adapted to connect a capillary 13 to another unit, such as another capillary (not depicted in FIG. 1). However, the fitting unit may also be adapted to connect the capillary 13 to another entity, such as a column for chromatography. FIG. 1 shows a socket unit 1 (that may also be referred to as a female connection unit) and a plug unit 2 (that may also be referred to as a male connection unit). The plug unit 2 is adapted to be fitted with the socket unit 1. Socket unit 1 and plug unit 2 may be connected to one another. In other words, socket unit 1 and plug unit 2 may be secured to one another. The connection between socket unit 1 and plug unit 2 may be sufficiently strong to enable safe usage of the capillaries. For example, in case the fitting assembly is employed in HPLC, the connection between socket unit 1 and plug unit 2 should be adapted to allow pressures of more than about 50 bar to pass through the capillary and still hold the connection, preferably more than about 100 bar, more preferably more than about 1,000 bar, such as about 1,500 bar. Typically, socket unit 1 and plug unit 2 may be screwed to one another to connect and secure these two units to one another. However, according to one aspect of the present invention, socket unit 1 and plug unit 2 may not comprise threads for their interconnection. Instead, a connection mechanism between socket unit 1 and plug unit 2 is provided, which connection mechanism has a predetermined and limited number of discrete connection states. In the embodiment depicted in FIG. 1, the connection mechanism is realized as a snap fit mechanism. In that regard, the socket 1 comprises snap fit elements 19 (here: balls) adapted to snap into a respective recess or groove 8 (also referred to as indentation 8) in the plug unit 2. That is, in simple words, a user may insert the plug unit 2 into the socket unit 1. As long as the groove 8 is longitudinally displaced from the snap fit elements 19, plug unit 2 and socket unit 1 are not secured to one another. That is, they may move relatively freely with respect to one another. Such a state is identified as a non-connection state. When the groove 8 is longitudinally aligned with the snap fit elements 19, the snap fit elements 19 snap fit into the groove 8 and provide a secure connection between the socket unit 1 and the plug unit 2, that is a connection allowing the intended use of the capillary 13 (e.g., fluid flow at an increased pressure). It will be appreciated that the depicted embodiment comprises one connection state (i.e., the state when the snap fit elements 19 are in longitudinal alignment with the groove 8). Furthermore, it will be appreciated that groove 8 in plug unit 2 may be one or a plurality of grooves and recesses (generally, usage of a singular does not preclude the possibility of a plurality of elements). If a single groove 8 is provided in plug unit 2, it may be provided around the complete circumference of the plug unit 2. However, alternatively, a plurality of grooves or recesses 8 may be provided. In case a single groove 8 around the periphery is provided, the plug unit 2 may still be adapted to rotate around the longitudinal axis when plug unit 2 and socket unit 1 are connected to one another. However, such a rotation does not alter the longitudinal positions of the plug unit 2 and the socket unit 1 with respect to one another. Thus, such movement does not alter the principal longitudinal connection, which is why such a connection is regarded as one connection state. That is, in such an embodiment, there would be one connection state. It will further be appreciated that one snap fit element 19 may be provided. If that is the case, the snap fit element 19 may fit all the way around the groove 8, i.e. be a continuous snap fit element. Alternatively, 2 or more snap fit elements may be provided fitting within the groove 8 at different longitudinal locations.

It will be appreciated that in other embodiments, there may be two or more longitudinal connection states. For example, there could be provided two or more longitudinally displaced rows of snap fit elements 19 and/or two or more longitudinally displaced rows of grooves 8. This would result in an increased (but still limited) number of discrete connection states.

It will also be appreciated that the exact connection mechanism between the plug unit 2 and the socket unit 1 is not limited to a snap fit mechanism. Other connection mechanisms, such as bayonet connection mechanisms, may also be employed (as discussed below).

Providing discrete connection states, instead of providing continuous connection states (such as in a screwed connection mechanism) may be advantageous. When having discrete connection states (such as in a snap fit connection), a predetermined force may be employed when the socket unit and the plug unit are connected to one another. In contrast, when using continuous connection states (e.g., a screw type connection state), the connection force may depend on how far the plug unit is threaded into the socket unit. When making use of such continuous connection states, too little force may be applied (resulting in a connection which may potentially not be fluid tight) and too much force may be applied (risking breakage or deformation of elements, e.g., the capillary). Such problems do not occur when using the described discrete connection mechanism. Here, the connection states and thus the connection force are predetermined. Thus, a more reliable, fail-safe and user friendly connection mechanism is provided.

At least one of the discrete connection states may be adapted to withstand a disconnecting force (i.e., a force applied to the socket unit 1 or the plug unit 2, when the other of the two is firmly fixed) of 5 N, more preferably 10 N, such as about 15 or 19 N, but not to withstand a disconnecting force of 50 N, more preferably 30 N, such as about 20 N, that is to disconnect at such disconnecting forces. Such forces may lead to a safe and reliable connection of socket unit 1 and plug unit 2, while at the same time allowing socket unit 1 and plug unit 2 to be disconnected at the user's will and preferably without the need for a special tool being employed for the fixation and separation.

The socket unit 1 comprises at least a housing 3 comprising a housing axial cavity (or a bore) 31, giving rise to a housing outer surface 32 and a housing inner surface 33. In the depicted embodiment, the socket unit 1 also comprises at least one socket indentation 18, at least one snap fit element 19 adapted to fit within the socket indentation 18 and at least one holding element 21 adapted to fix the snap fit element 19 within the socket indentation 18 from the side of the outer surface 32. In some embodiments, the socket unit 1 comprises a sealing or union inlay piece 5. Generally, the socket unit 1 may comprise a socket sealing surface for sealing against the capillary 13. The socket sealing surface is typically arranged orthogonal to the longitudinal axis of the socket unit 1. Put differently, the socket sealing surface is perpendicular to the insertion axis between the socket unit 1 and the plug unit 2. The sealing surface can also be radial or conically oriented with respect to the longitudinal axis of the socket unit 1. Such a socket sealing surface (here: the surface of the union inlay piece 5 facing the plug unit 2) may also be referred to as the socket floor. Generally, the socket floor may be formed from a soft material, preferably PEEK or gold, such that the capillary 13 is sealed against a suitable sealing material.

The plug unit 2 comprises at least a gripping element 7, at least one plug indentation or groove 8, a pushing element 9, a capillary 13, a jacket layer 15, a biasing element 17 and a knurl 23. In some embodiments, the plug unit 2 further comprises a sealing element 11. The sealing element 11 may provide the sealing of the capillary 13 at its end. In some embodiments, the sealing element 11 can assist the sealing between the capillary 13 and the union inlay piece 5. Additionally, the sealing element 11 may also protect the end of the capillary 13 from damage, particularly due to crimping forces, and to stabilize and/or center it during connection and disconnection of the plug unit 2 and the socket unit 1. More particularly, the sealing element 11 may be adapted to seal at the forward end of the plug unit 2. In other words, the sealing element 11 has a sealing surface facing the forward direction and being perpendicular to the longitudinal axis of the plug unit 2.

A longitudinal distance between the discrete connection mechanism and the end sealing of the capillary 13 may be in the range of 5 to 15 mm, more preferably 7 to 13 mm, even more preferably 9 to 10 mm. That is, as regards the socket 1, the longitudinal distance (i.e., the distance along the longitudinal axis) between a socket sealing surface and the socket connection elements (here: snap fit elements 19) is in the above described range. As regards the plug unit 2, the longitudinal distance between a forward plug sealing surface and the plug connection elements (here: groove 8) may be in the above described range. Such a distance may be advantageous, as such a displacement between the connection element and the sections providing the sealing may lead to a particularly stable configuration.

The pushing element 9 is fitted around a capillary 13. In the depicted embodiment, the pushing element is urged towards the front of the plug unit 1 by means of the biasing element 17. Thus, it enables the connection between capillary 13 and the socket unit 2.

As discussed, the gripping element 7 would typically comprise for example a fitting screw or a fitting plug. However, in the depicted embodiment, the gripping element 7 comprises at least one groove 8 (such as two grooves 8) adapted to at least partially accommodate the snap fit elements 19 and to provide a snap fit connection of the plug 2 with the socket 1. A front portion of the gripping element 7 can be crimped around the pushing element 9. In this regard, it is noted that in this specification, the front of the plug unit 2 is the portion of the plug unit "closest" to the socket unit 1, i.e., the portion first inserted into the socket unit 1 upon connection. The gripping element 7 is attached to the capillary 13. If the capillary tube 13 is made of a fragile material such as glass, a jacket layer (interlayer) 15 and/or a sealing element 11 can be placed around it to prevent breakage. The jacket layer 15 can for example be made out of PEEK, making it sufficiently deformable and strong.

The socket indentations 18 comprise a narrowing of the inner diameter. This can for instance be realized by drilling a hole from the outer surface 32 of the housing 3 not going all the way through to the inner surface 33 of the housing 3 and then boring a hole of a smaller diameter starting where the larger hole stopped and going all the way through to the inner surface of the housing 3. Inside the socket indentations 18, snap fit elements 19 can be fitted from the outer surface of the housing 3 and held in place (i.e. from the outer surface 32 of the housing 3) by holding elements 21. Snap fit elements 19 can for example comprise balls as shown in this embodiment. However, they can also comprise pins or other differently shaped objects. In one embodiment, one snap fit element 19 comprising a toroid can be provided. In such an embodiment, the snap fit element 19 can fit within the groove 8 all the way around. One snap fit element 19 can also comprise a different shape going partially around the groove 8, for example a part of a toroid. Alternatively, the snap fit element 19 can comprise a deformable toroid adapted to assume at least a circular and an elliptical aperture (alternatively, substantially elliptical, such as a deformed elliptical aperture). The holding element(s) 21 can comprise for example snap rings or holding compression springs. In some embodiments, the snap fit elements 19 can be arranged at an angle to provide an axial sealing force as well as a holding force. One holding element 21 can hold one or more snap fit elements 19. For example, snapping element(s) 21 can comprise one or two snap rings placed on one or both sides of the snap fit elements 19, all around the housing 3. In the figure, only the top ball 19 and holding element 21 are indicated, as it is clear that the bottom ones comprise the same components. The snap fit balls 19 can have a diameter of 1 to 2 mm, preferably about 1.5 mm. The socket unit 1 can comprise 2 to 6, more preferably 2 to 4 snap fit elements 19 with the corresponding socket indentations 18 and holding elements 21.

The plug unit 2 comprising the gripping element 7 can be inserted into the housing axial cavity 31 once the snap fit elements 19 are in position. The snap fit elements 19 are then pushed outwards towards the outer surface 32 of the housing by the gripping element 7 until they snap into the at least one groove/recess 8 in the gripping element 7 and are held by the holding elements 21.

The biasing element 17 provides the axial sealing force to reliably seal the face side of the capillary 13. The biasing element also helps modulate the tolerances within the system. In particular, the biasing element allows for more flexibility in the exact dimensions of the gripping element and the pushing element. The biasing element 17 can for example comprise a spring as demonstrated in the figure. The biasing element 17 can also comprise one or more Belleville washers. The biasing element 17 can have a spring constant in the range of 1 N/mm to 20 N/mm, more preferably 5 N/mm to 15 N/mm, even more preferably around 8-12 N/mm. Furthermore, in another embodiment, the biasing element 17 comprises at least one snap fit element 19. In such an embodiment, the snap fit elements 19 are aligned forwards at an angle and provide both an axial sealing force and a radial holding force applied to the gripping element 7. In other words, in such an embodiment, the snap fit elements 19 provide both a snap fit and a force pushing the plug unit 2 in a forward direction, i.e., into engagement with the socket unit 1.

A knurl 23 may be provided which is adapted to be detached from the housing 3.

A union inlay piece 5 can be used to seal the capillary 13 and to provide a fluid tight connection of the capillary 13 to another unit (e.g., another capillary or a chromatography column). It is described in detail below. A sealing element 11 serves to seal against the union inlay piece 5 axially and is discussed in more detail below.

In the present embodiment, the socket unit 1 comprises snap fit elements 19 and the plug unit 2 comprises a groove 8, however, a skilled person will understand that the reverse is also possible to assure a snap fit connection. In such a reverse embodiment, the socket unit 1 would comprise the groove 8 and the plug unit 2 the snap fit elements 19. This is also possible with a bayonet connection—the socket unit 1 could comprise the bayonet cavity and the plug unit 2 could comprise pins or other protruding elements adapted to be fitted securely with the bayonet cavity on the socket unit 1.

Figure 2:
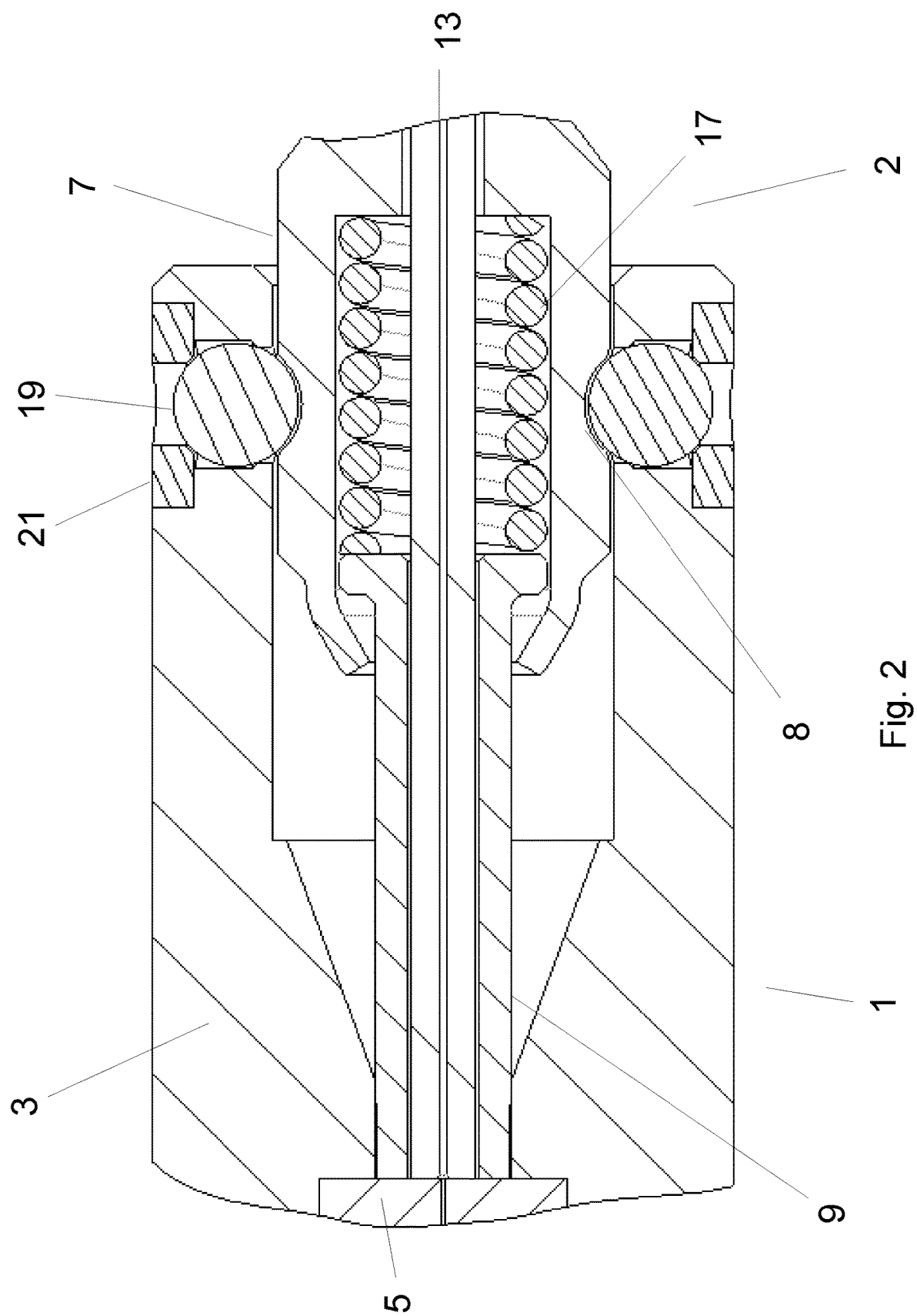
FIG. 2 depicts a zoomed in embodiment of the fitting system according to one aspect of the invention.

FIG. 2 depicts another embodiment of the fitting system according to one aspect of the invention. The figure shows a zoomed in view compared to FIG. 1. In this embodiment, the capillary 13 is made of metal or an otherwise sturdy material, and hence does not need to have a jacket layer 15 around it. Furthermore, the depicted embodiment is also devoid of a sealing element 11, though in other embodiments, such a sealing element 11 may be provided. Otherwise, this embodiment comprises similar parts and components as the embodiment depicted in FIG. 1. That is, in this embodiment, the seal may be provided by the forward end surface of the capillary 13 and/or the forward end surface of the pushing element 9.

Figure 3:
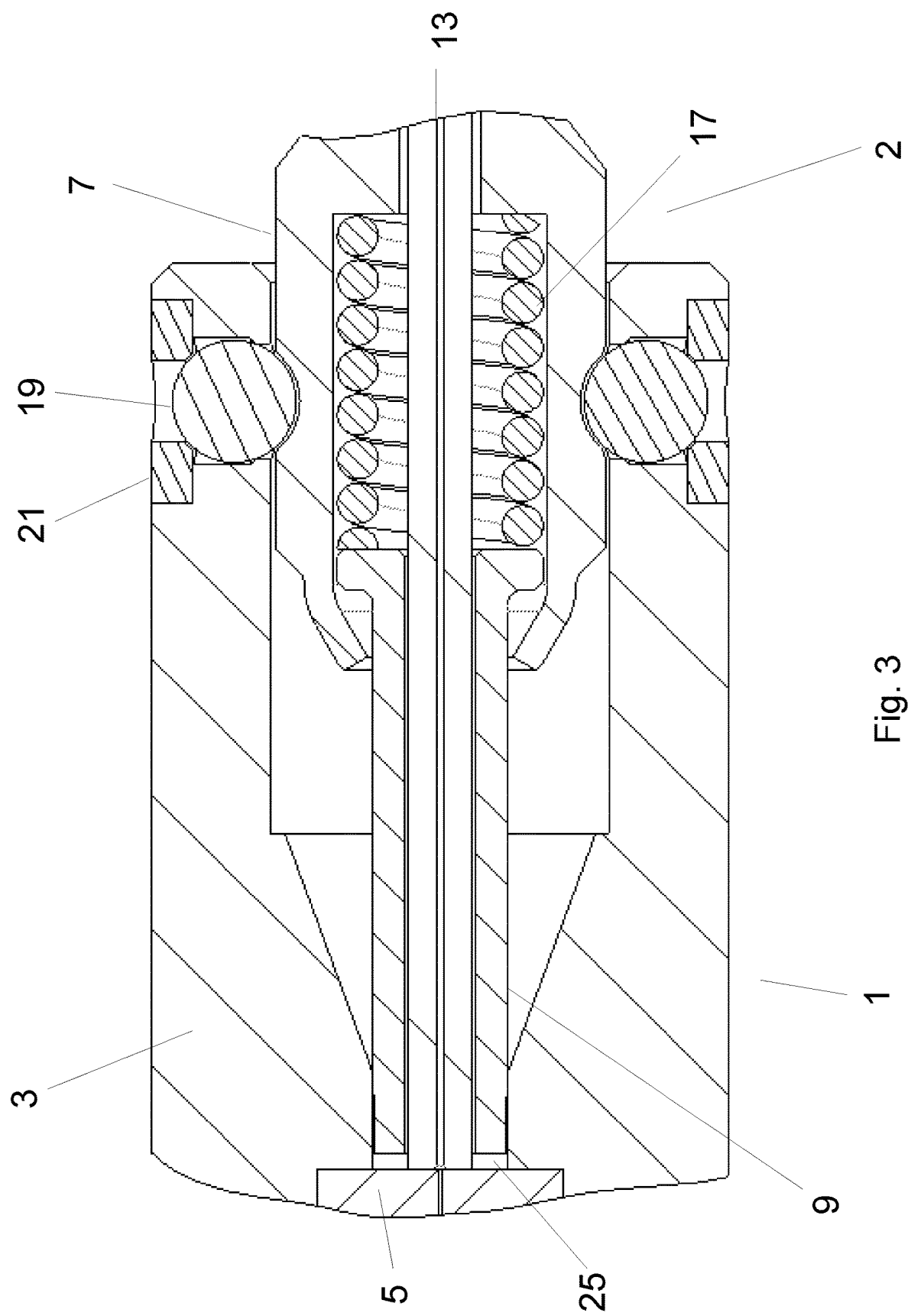
FIG. 3 depicts another zoomed in embodiment of the fitting system according to one aspect of the invention.

FIG. 3 depicts another zoomed in embodiment of the fitting system according to one aspect of the invention. In this embodiment, the capillary 13 may extend beyond the pushing element 9. In this embodiment, the capillary 13 can also be made of a softer material such as PEEK and the floor wall of the socket 1 (i.e. the wall of the socket 1 coming into contact with the forward sealing surface of the plug unit 2) of a harder material such as stainless steel or titan. In this way, the capillary 13 could be sealed on the face side. That is, the forward facing surface of the capillary 13 may provide the sealing between the capillary 13 and the socket unit 2. Conversely, it is also possible that the capillary 13 could be made of metal or otherwise hard material and the floor wall of the socket 1 of a softer one.

Figure 4:
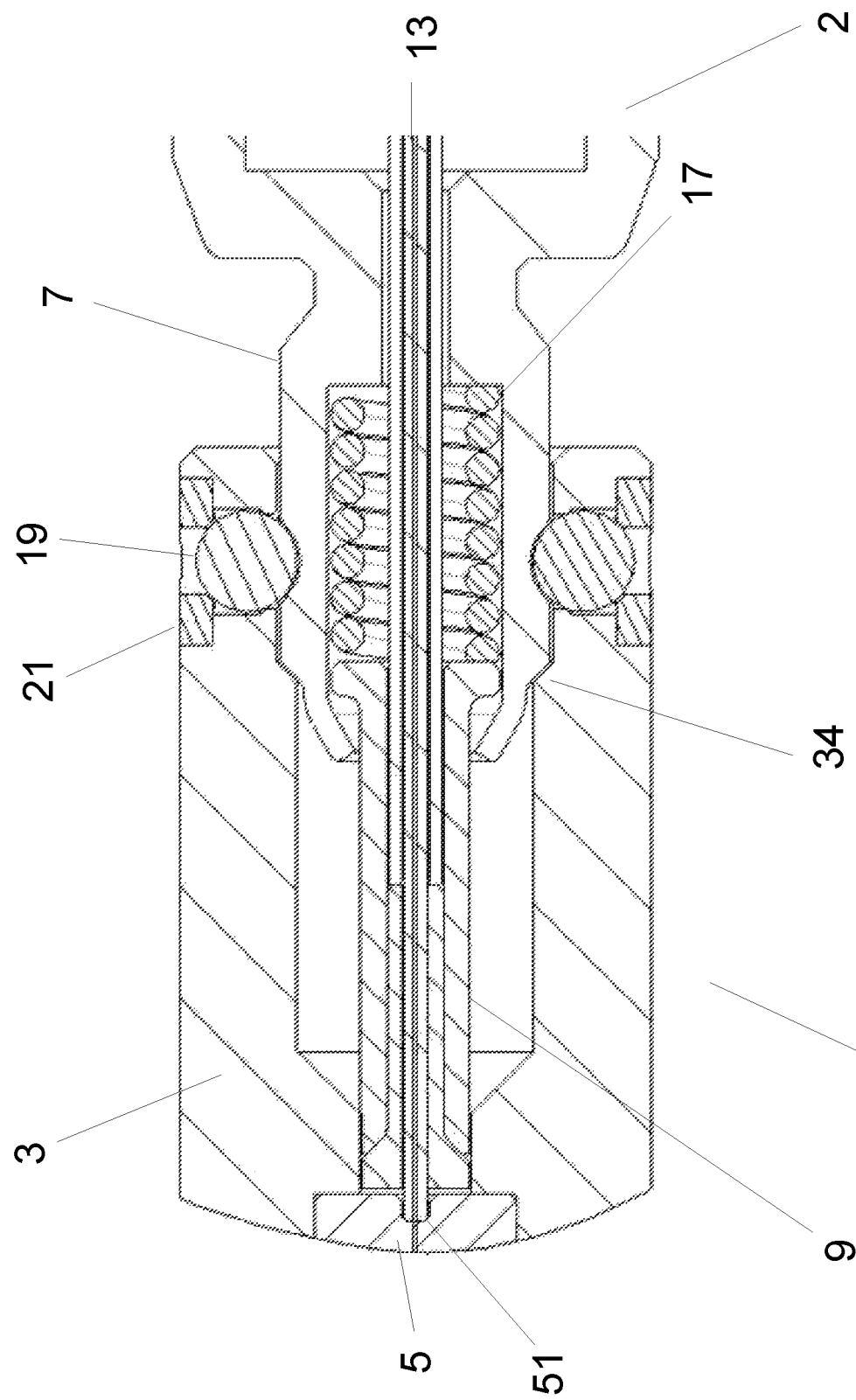
FIG. 4 depicts yet another zoomed in embodiment of the fitting system according to one aspect of the invention.

FIG. 4 depicts yet another zoomed in embodiment of the fitting system according to one aspect of the invention. In this embodiment, the capillary 13 is further protected from breakage or deformation by an addition of an indentation 51 into the sealing inlay piece 5 of the socket unit 1 to which the capillary 13 is connected. The indentation 51 has a narrow opening thereby assuring that the capillary 13 is not broken from insertion into a too wide opening. The indentation 51 can also be adapted to center and seal the capillary to at least avoid dead volume and to seal the connection. A skilled person will understand that indentation 51 is optional. In some embodiments, the capillary 13 seals head on against the union inlay piece 5.

FIG. 4 further depicts an abutment 34 on the inner surface of the housing 3. The abutment serves to protect the plug unit 2 in general and the capillary 13 in particular from excessive force applied during connecting of the plug unit 2 and the socket unit 1. The abutment is adapted to stop excessive advancement of the plug unit 2 during connection. The plug unit 2 can also be adapted to have a corresponding protrusion fitting with the abutment 34.

In the foregoing, the connection between a socket unit 1 and a plug unit 2 has been described, which connection provides a limited number of discrete connection states. The present invention also pertains to retrofitting existing connections between existing socket units (not depicted) and plug unit 2. For example, such socket units may comprise a thread. To retrofit such socket units, one aspect of the present invention also pertains to an adaptor. The adaptor is adapted to be fitted or connected to the socket unit. For example, the adaptor may comprise an (external) thread adapted to be connected to the thread of the socket unit. As regards the connection between the adaptor and the plug unit, the adaptor may comprise features corresponding to the features described with regard to the above described socket unit. Thus, for brevity of description, these features are not described in further detail.

Figure 5:
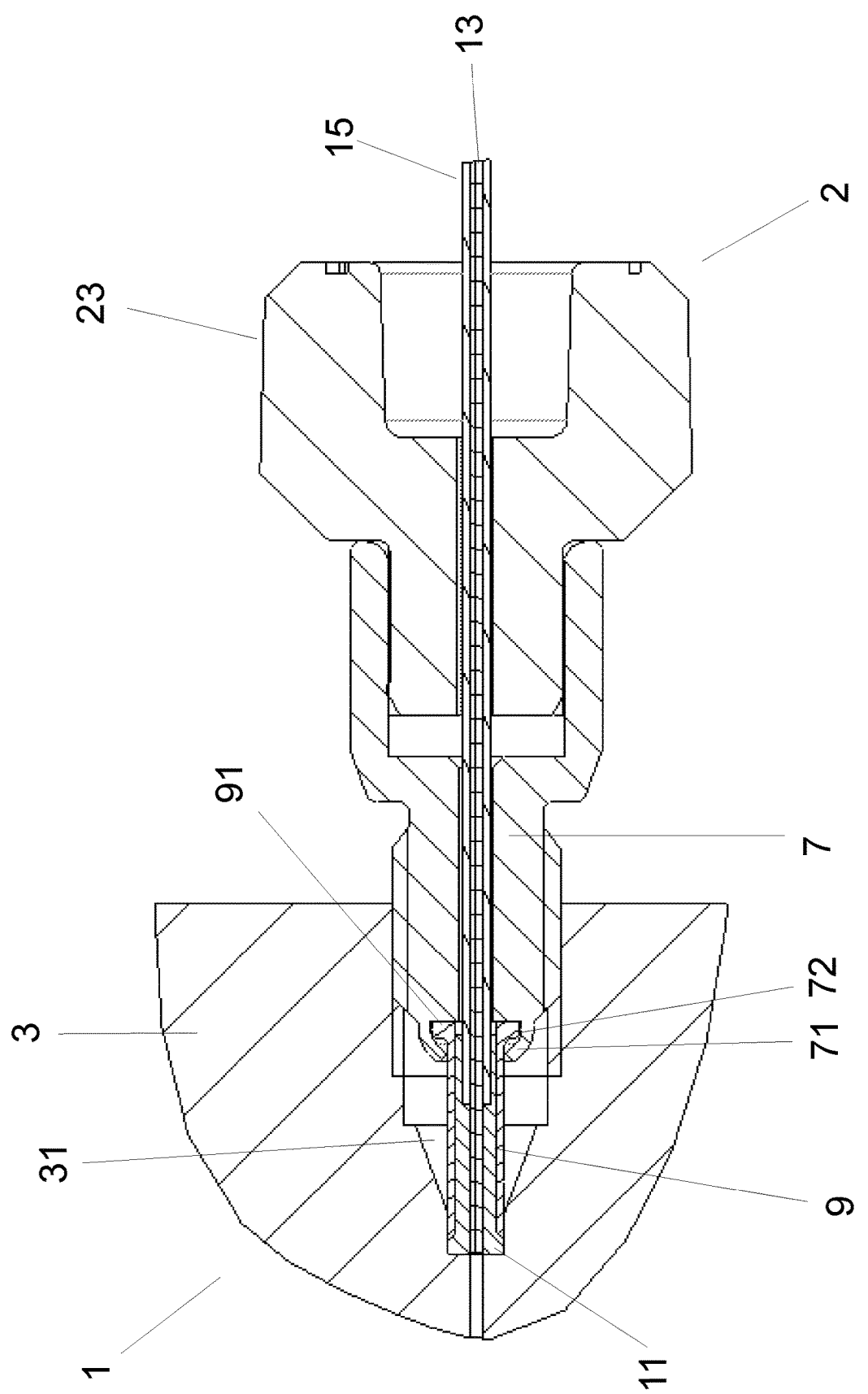
FIG. 5 depicts a curved connection according to one aspect of the invention.

FIG. 5 shows an embodiment of a plug unit 2 curved inward connection according to one aspect of the invention. In this embodiment, the plug unit 2 comprises the gripping element 7 with a curved inward forward end 71 allowing for a secure connection with the pushing element 9. In some embodiments, the connection between the gripping element 7 and the pushing element 9 allows for some axial and/or radial motion between the two elements without disconnecting them. In particular, the connection between the gripping element 7 and the pushing element 9 may be such the pushing element 9 is pulled out by the gripping element 7 when disconnecting the gripping element 7 from a socket unit 1. While this aspect of the present invention is depicted independently from the above described aspects mainly relating to the connection mechanism between socket unit 1 and plug unit 2, it will be appreciated that these aspects may also be employed together.

The housing 3 comprises a housing axial cavity 31 within which the gripping element 7 can be fitted. The gripping element 7 can for example be a fitting screw. That is, in other words, the gripping element 7 may comprise threads adapted to engage threads in the socket unit 1. Alternatively, the above described connection mechanism may be used. The gripping element 7 comprises a gripping element axial cavity. The gripping element 7 also comprises the curved inward end 71 at its front end. The curved inward end 71 is bent in on itself, i.e. towards the gripping element axial cavity. In this way, an end cavity 72 is realized.

The pushing element 9 comprises at least one shoulder 91. This shoulder is adapted to fit within the end cavity 72 and to become engaged with the curved inward end 71. In this way, the pushing element 9 and the gripping element 7 are securely attached. However, some radial and/or axial motion between the two can be allowed. When the plug unit 2 and the socket unit 1 are disconnected from each other (e.g., unscrewed), the gripping element 7 pulls the pushing element 9 along and the pushing element 9 pulls the capillary out as well. In one embodiment, the curved connection between the gripping element 7 and the pushing element 9 is adapted to withstand a separating force between the two, which separating force is in the range of 100-1000 N, such as about 1000 N. The separating force in this embodiment may be based on the strength of the used materials. The curved inward end 71 of the gripping element 7 ensures that when using standard capillary connections, the gripping element 7 is held fixedly in position and does not, therefore, slide uncontrollably on the capillary 13.

Figure 6B:
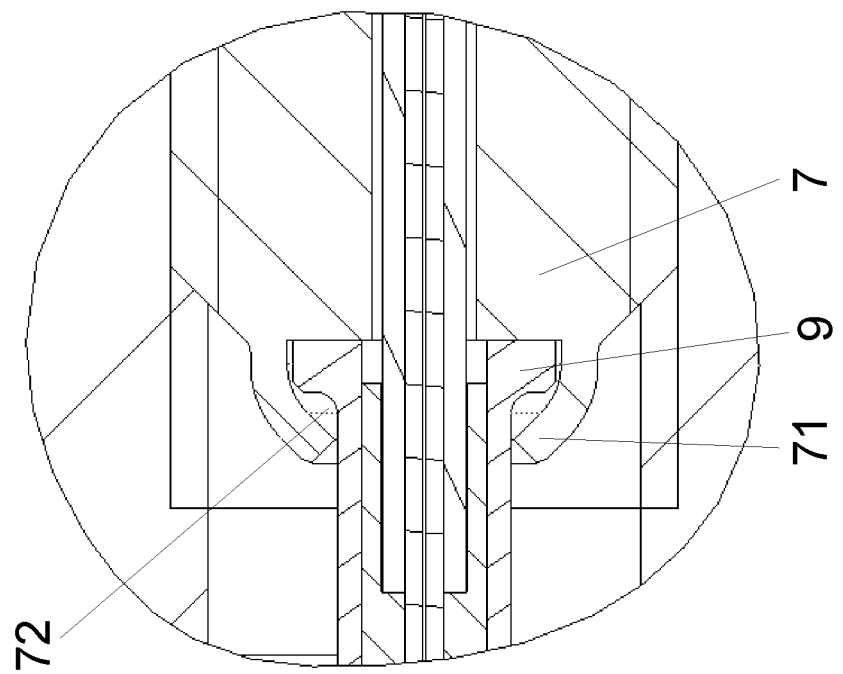
FIGS. 6a and 6b depict steps to arrive at the curved connection.
Figure 6A:
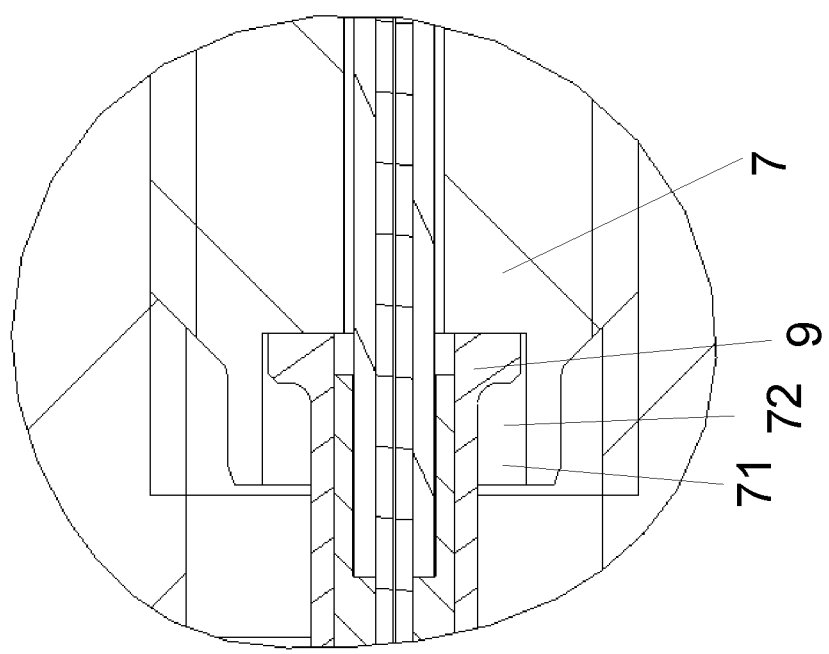

FIGS. 6*a* and 6*b* demonstrate steps to arrive at the curved connection. FIG. 6*a* shows the state before the end section of the gripping element 7 is curved inward. After curving, the gripping element 7 comprises the curved inward end 71. Before curving, the pushing element 9 is not fixed within the end cavity 72 and may stay within the housing axial cavity 31 on disconnection or unscrewing of the socket unit 1 and the plug unit 2. Conversely, FIG. 6*b* depicts the connection after curving of the end. The gripping element 7 now comprises the curved inward end 71. The pushing element 9 is fixed within the end cavity 72 by the sealing force and will be pulled by the gripping element 7 on disconnection.

Figure 7:
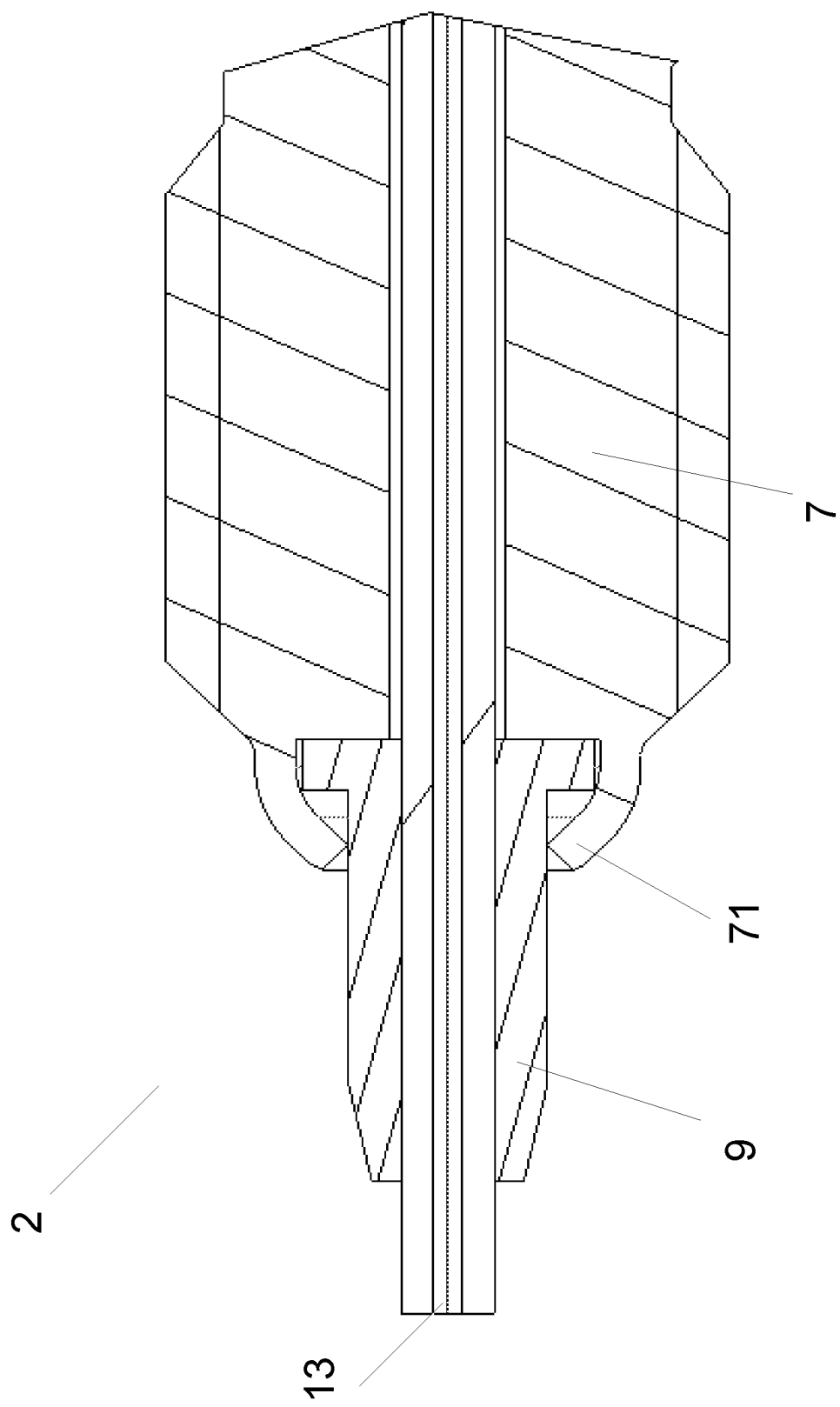
FIG. 7 depicts an embodiment of the plug unit with a curved inward end arrangement.

FIG. 7 depicts an embodiment of the plug unit 2 according to another aspect of the invention where the curved connection is used to connect the gripping element 7 with the pushing element 9. The pushing element 9 would be pulled out by the gripping element 7 when being disconnected. Since the pushing element 9 is crimped around the capillary 13, the capillary 13 itself would experience less force during disconnecting and would be less likely to become deformed or to break. FIG. 7 depicts an embodiment not comprising a biasing element (such as biasing element 17 in FIG. 1).

Figure 8:
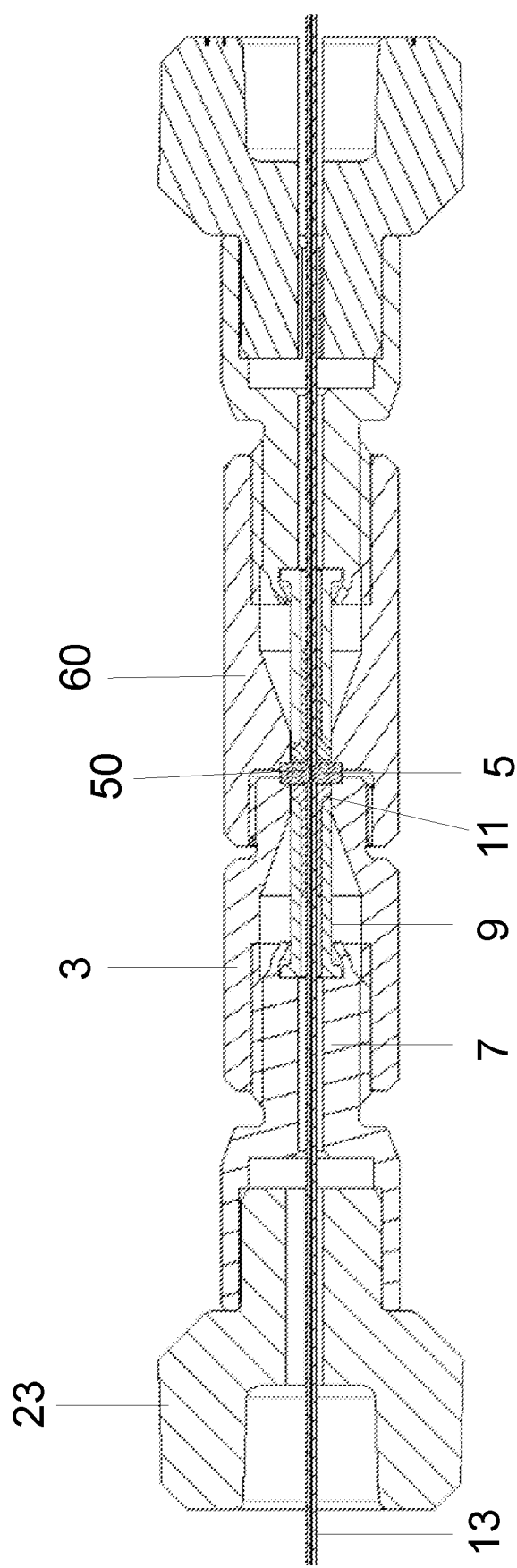
FIG. 8 depicts an embodiment of the sealing inlay unit and the fitting system according to one aspect of the present invention.

FIG. 8 depicts an embodiment of a sealing inlay unit 300 according to the invention. Two capillaries 13 are connected in the figure. The housing 3 is fitted within a mold 60 to provide a basic connection. In the depicted embodiment, the union inlay piece 5 serves as the boundary between the two capillaries 13. The sealing element 11 provides protection for the capillaries 13 and serves to seal the system, e.g., by means of an abutment. The union inlay piece 5 comprises an inlay cavity 50 through which the liquid passes from one capillary 13 to the other. The pushing element 9 is fitted with gripping element 7 as discussed previously.

The capillary 13 is tightly pressed with its face side against a soft and dense body comprising the union inlay piece 5. The capillary thus forms the precise geometry needed for a tight seal avoiding dead volumes within the union inlay piece 5. The union inlay piece 5 can be made of PEEK, polypropylene or similar plastics. It could also be made of gold, silver or a similar material. It could be made of a conductive PEEK such as PEEK HPV (by Quadrant) or TECAPEEK ELS nano (by Ensinger). The union inlay piece 5 may be made from an extruded PEEK (capillary) tube instead of mechanical machining. In such a case, respective sections (e.g., discs having the correct thickness) would have to be cut from the PEEK capillary tube. It could also have a core made of metal and be coated or injection molded with PEEK on the surface. The inlay could also be injected. The whole union inlay piece 5 could be manufactured from a single piece of PEEK. The inlays piece 5 may also be part of an element adapted to be screwed into existing connection ports. Thus, said element would already comprise the sealing capabilities, such that existing fittings/sockets (e.g., adapted for the sealing of a ferrule) could be retrofitted to seal at the face, i.e., with a surface perpendicular to the longitudinal axis of socket and plug. In some embodiments, the union inlay piece 5 is softer than the capillary 13 to allow for a tight seal between the two. Therefore, different union inlay pieces 5 could be used for different capillary materials (which could be glass (fused silica), stainless steel, MP35N or titan, for example).

The capillary 13 may be provided with a pushing element 9, since the pushing element 9 applies axial sealing force on the capillary 13 by means of the gripping element 7. For metal capillaries 13, the pushing element 9 can be crimped, welded or glued directly on the capillary 13. For crimping of softer capillaries 13 such as glass, it is advantageous to add a jacket layer 15 from plastic between the capillary 13 and the pushing element 9, e.g., to prevent capillary breakage. In case of gluing, however, this may be omitted.

The sealing inlay unit 300 can be made of several components, for example a two-part housing 3 (here housing 3 and mold 60) and a separate union inlay piece 5. This has the advantage that the union inlay piece 5 can be exchanged as needed, for example in case of wear and tear. The inlay cavity 50 can have different diameters, e.g., diameters larger than about 30-300 µm. The inlay cavity 50 could also comprise different materials for different applications—for example conductive PEEK for electrical contact of the liquid passing through (for example for use in mass spectrometry applications).

The union inlay piece 5 can first be placed within one half of the housing 3 and then covered with the second half of the housing (here mold 60). The housing halves can be screwed or otherwise fitted together. The capillary 13 can now be pushed towards the union inlay piece 5 by an axial force sealing, e.g., from a threaded screw or from a spring for example. The capillary 13 forms exactly the optimal geometry in the seal and therefore a dead volume free connection can be formed.

Figure 9:
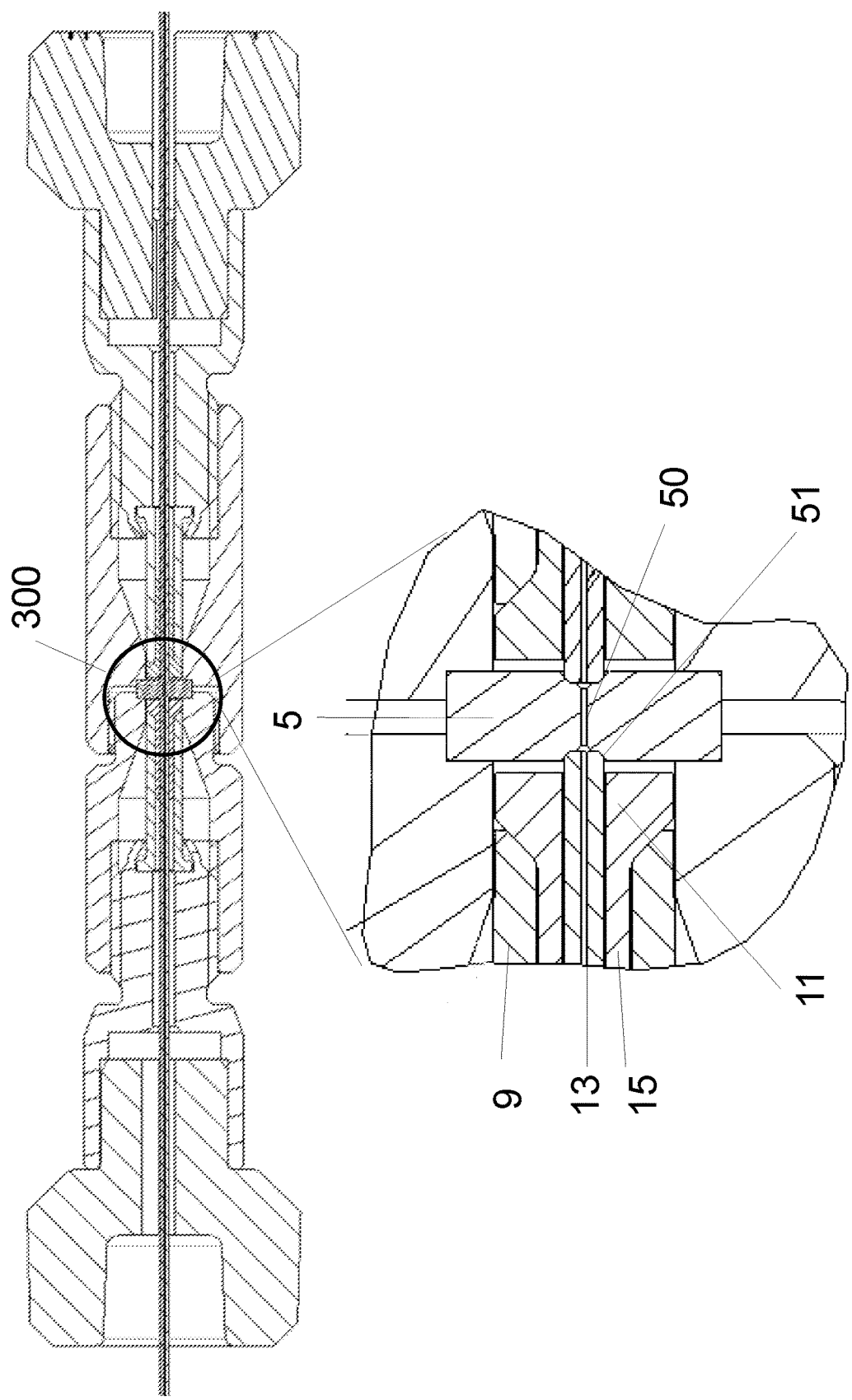
FIG. 9 depicts a zoomed in embodiment of the sealing inlay unit according to the present invention.

FIG. 9 depicts a zoomed in embodiment of the sealing inlay unit 300. The union inlay piece 5 may also comprise at least one side indentation 51 for centering and radially aligning the capillary 13. The indentation(s) 51 also reduce(s) the chance of the capillary scraping against the union inlay piece 5 and producing debris. Further, the indentation(s) 51 may help reduce tensions in the corner areas of the capillary 13, in particular for fused silica capillaries. Furthermore, the inlay piece 5 comprises a bore or channel or cavity 50 through which fluid may flow. This cavity 50 typically has a diameter of, e.g., 50 µm. At least on one end of the cavity 50 (preferably on both ends), the indentation 51 is formed. Said indentation 51 is a (relatively short) channel comprising a diameter, e.g., of 0.3-0.6 mm, more preferably 300-500 µm, even more preferably 350-400 µm. The length of the indentation may be in the range of 0.3-0.6 mm, more preferably 300-500 µm, even more preferably 350-400 µm. This indentation channel 51 may have a constant diameter or the channel may be tapered. The capillary 13 may (tightly) fit into this indentation 51. Thus, the indentation(s) 51 may center and radially align the capillary 13. Furthermore, by having this/these indentation(s) 51, the bore depth for creating the cavity 50 may be reduced by the length of the indentation channel(s) 51. The sealing inlay piece may have a thickness of about 1500 µm. Such a thickness may be advantageous to have the sealing inlay piece 5 withstand the axial sealing force applied by the capillary 13. Typically, one may drill a borehole having a length of approximately 14 times the diameter of the borehole. For example, when the diameter of the cavity is 50 µm, the length of such a borehole would be 700 µm. By adding two indentations 51 at the ends of the cavity 50 and each indentation 51 having a length of 400 µm, the overall thickness of the sealing inlay piece could be about 1500 µm. Thus, the indentations 51 may also help in the production process of the sealing inlay piece 5.

The sealing element 11 reduces the axial movement and serves as additional support for the capillary tube 13 against buckling. The sealing element 11 can comprise a shoulder made of PEEK or metal. It can be molded directly on the pushing element 9 or on the jacket layer piece 15. Such shoulder can protect and secure the capillary.

The sealing inlay unit 300 allows tight sealing of the capillary 13 with a much smaller necessary sealing force. Since only the capillary 13 is pressing against the sealing inlay piece 5, a much smaller axial sealing force is necessary for a tight seal. The outer diameter of a fused silica capillary 13 can be for example 280 µm or 360 µm. A standard fitting connection has a diameter of about 1.65 mm. Therefore, the required force for sealing the capillary alone can be 10-20 times lower.

With an extra adapter, existing ferrule-based capillary connectors could be retrofitted to instead be face side sealing connectors as the one described herein.

Figure 10:
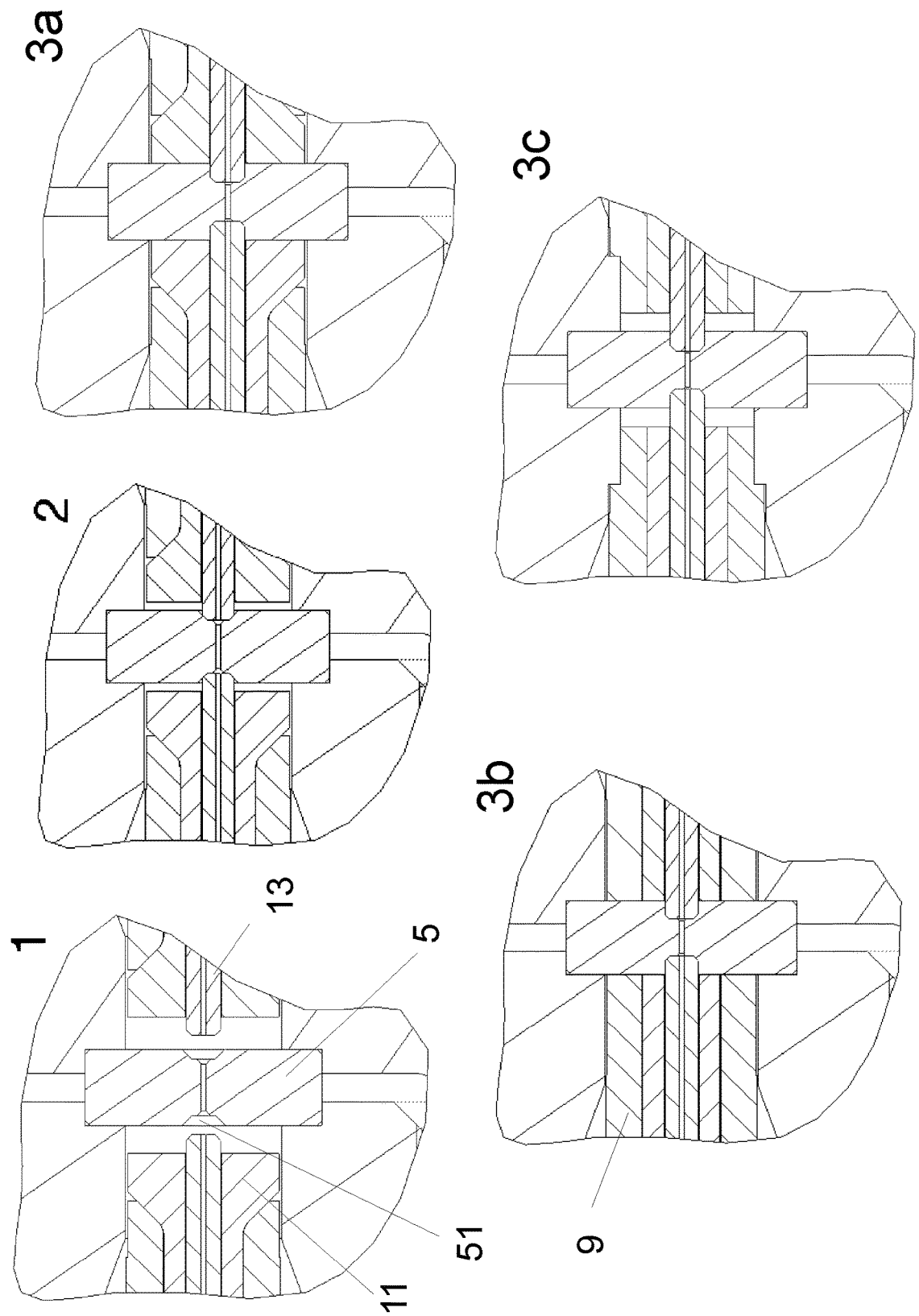
FIG. 10 depicts the sealing inlay unit in use in a step-by-step arrangement (Sketches 1, 2, 3a, 3b, and 3c).

FIG. 10 depicts a sealing inlay unit 300 in use in a step-by-step arrangement. Sketch 1 shows the sealing inlay piece 5 with the indentation(s) 51 for centering and radially aligning the capillary 13. The capillary 13 is protruding beyond the sealing element (shoulder) 11. Sketch 2 shows the capillaries 13 centered within the indentation(s) 51. The sealing starts at this point. Sketch 3a shows the capillaries 13 received within the indentation(s) 51. The sealing element (shoulder) 11 has aligned with the sealing inlay piece 5. Sketch 3b shows another embodiment of one aspect of the invention where the sealing element 11 is not present. The contact in this case is between the sealing inlay piece 5 and the pushing element 9. Sketch 3c shows an alternative embodiment to sketch 3b where the pushing element 9 is not in contact with the sealing inlay piece 5.

Figure 11:
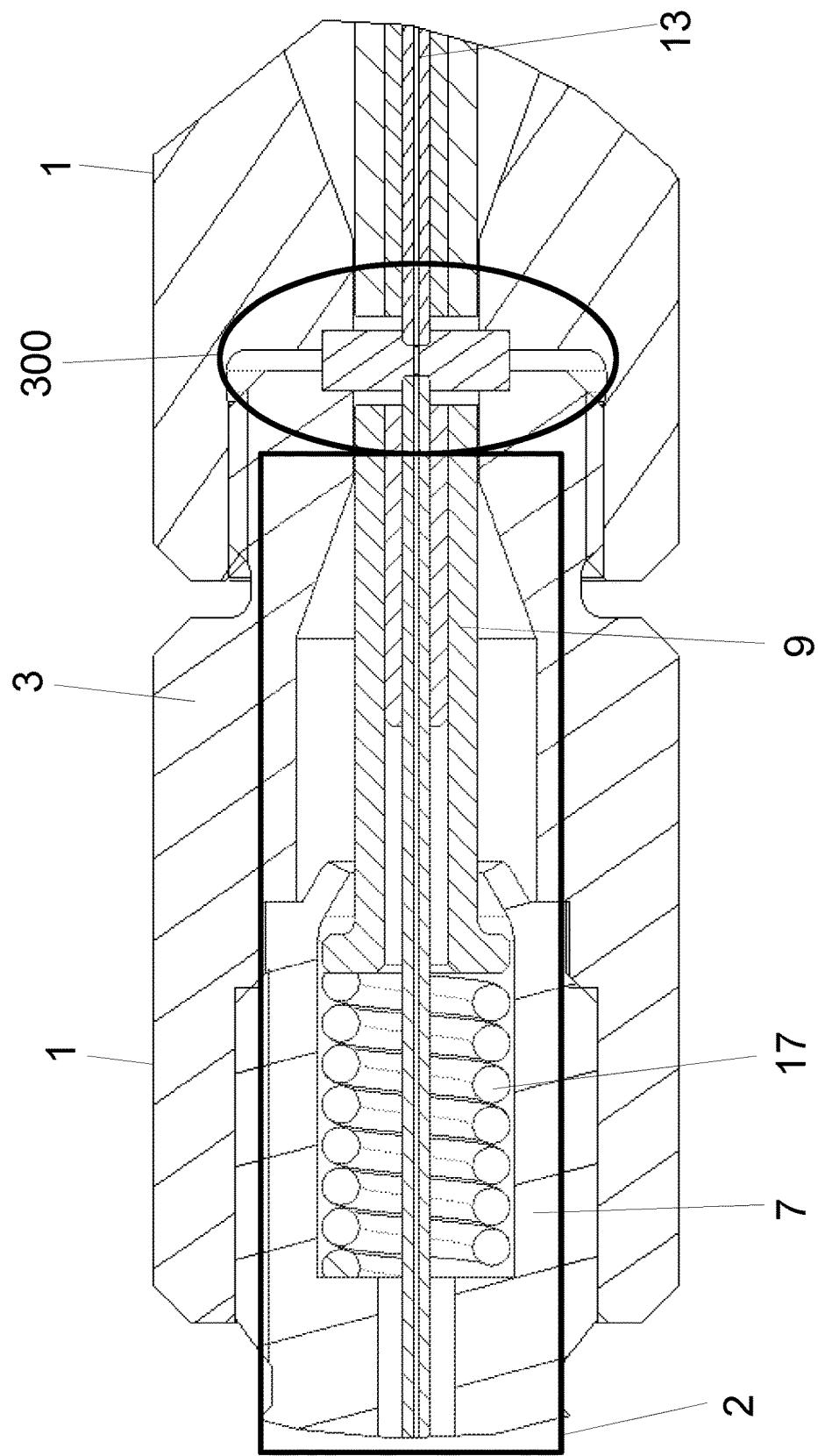
FIG. 11 depicts the plug and play system for capillary connection.

FIG. 11 depicts a plug and play system for capillary connection. In this embodiment, two capillaries are connected or fitted together, but the invention can also be used to connect a capillary and a chromatography column, or a capillary and other parts of an HPLC apparatus or, more generally, a capillary and other devices, apparatuses or units. The plug unit 2 comprises the biasing element 17 adapted to apply the axial sealing force necessary for the sealing inlay unit 300 to seal the capillary 13 securely and reliably. The sealing inlay unit 300 also provides a substantially zero dead volume sealing. The sealing inlay unit 300 uses a sealing area equal to that of the face side of the capillary 13. Since this is much smaller than previously used sealing areas, a much smaller axial sealing force is needed—allowing the plug unit 2 to be fitted with the socket unit 1 without tool use. The sealing area can be in the range of 0.05 mm$^2$ to 0.5 mm$^2$, more preferably 0.05 mm$^2$ to 0.15 mm$^2$, even more preferably around 0.1 mm$^2$.

The plug unit 2 as shown here is screwed in, i.e. the gripping element 7 is screwed within the housing 3. However, in a preferred embodiment, the plug unit 2 and the socket unit 1 comprise a snap fit connection that can be fastened without any tool use. The gripping element 7 comprises a curved inward end 71 that holds the pushing element 9 securely and pulls it out along with the capillary on disconnection. Therefore, the plug unit 2 can be reused multiple times.

The biasing element 17 can be adapted to increase the sealing force tolerance to modulate the sealing force in the connection state of the system. It can provide further tolerance and flexibility to the system as a whole.

Different forces supplied to the connection mechanism will now be described with reference to FIG. 2. When the plug unit 2 and the socket unit 1 are connected to one another and one tries to disconnect these units from one another, different forces are present. First, there is a holding force $f_{holding}$, which is due to the connection mechanism between the plug unit 2 and the socket unit 1. In the depicted embodiment, the holding force $f_{holding}$ is provided by the snap fit mechanism and hinders the plug unit 2 to be readily disconnected from the socket unit 1. As a mere example, the holding force may be 19.5 N. As discussed, a biasing member 17 (such as a spring) may be provided, which urges the pushing element 9 with a biasing force (not depicted) into engagement with the union inlay piece 5. As this force contributes to the sealing, this force may also be referred to as the sealing force. This biasing member also provides the sealing or biasing force $f_{biasing}$ urging the gripping element 7 to the right, i.e. in the direction of disconnection between the plug unit 2 and the socket unit 1. As a mere example, the biasing force $f_{biasing}$ may be 10 N. It will be appreciated that the holding force $f_{holding}$ needs to be greater than the biasing force $f_{biasing}$, i.e., $f_{holding} > f_{biasing}$. Otherwise, the system would readily disconnect. A disconnecting force $f_{disconnect}$ may be supplied to the system, i.e. a force in the direction of disconnection between the socket unit 1 and the plug unit 2. In the depicted embodiment, for example, the plug unit 2 may be moved to the right with a disconnecting force $f_{disconnect}$, while the socket unit 1 is spatially fixed. Vice versa, the plug unit 2 may be fixed and the socket unit 1 may be moved to the right with disconnecting force $f_{disconnect}$. As long as the sum of disconnecting force $f_{disconnect}$ and biasing force $f_{biasing}$ does not exceed the holding force $f_{holding}$, i.e., as long as $f_{disconnect} + f_{biasing} \leq f_{holding}$, plug unit 2 and socket unit 1 will remain connected to one another. However, when the sum of disconnecting force $f_{disconnect}$ and biasing force $f_{biasing}$ exceeds the holding force $f_{holding}$, i.e., when $f_{disconnect} + f_{biasing} > f_{holding}$, plug unit 2 will be disconnected from the socket unit 1. In the present example ($f_{holding}$=19.5 N, $f_{biasing}$=10 N), this would mean, e.g., that the connection mechanism is adapted to withstand a disconnecting force $f_{disconnect}$ of 5 N, 7 N or 9 N, but not to withstand a disconnecting force of 20 N, 15 N or 10 N. While the above example includes a biasing member 17 giving rise to a biasing force $f_{biasing}$, it will be appreciated that one may also design the connection such that it withstands certain disconnection forces (and separates at other disconnection forces), when no such biasing member 17 is provided. In such a case, the limit of the separation force may depend on the holding force of the connection.

The plug and play capillary connection system can be adapted to have a sealing or biasing force of about 5 to 25 N (such as about 10 N), a holding force of about 10 to 50 N (such as about 20 N), which holding force is larger than the sealing force. Such a system may be adapted to withstand a disconnecting force, which disconnecting force is not greater than the difference between the sealing force and the holding force, of about 5-45 N (such as about 10 N), but not to withstand a disconnecting force greater than the difference between the sealing force and the holding force. As discussed, the sealing force is the force with which the capillary is sealed against the sealing inlay piece 5, the holding force is the force generated by connection mechanism, such as the snap fit or the bayonet connection. Such range of forces is advantageous to avoid the use of tools for connecting the system and still guarantee a tight and reliable connection. Note that the separating force is the force necessary to separate the gripping element and the pushing element when the gripping element comprises a curved inward end.

The plug and play capillary connection system is thus easy to use without tools, provides a tight and secure substantially zero dead volume connection and can be reused without loss of components, making it ideal in particular for high pressure liquid chromatography applications.

Figure 12B:
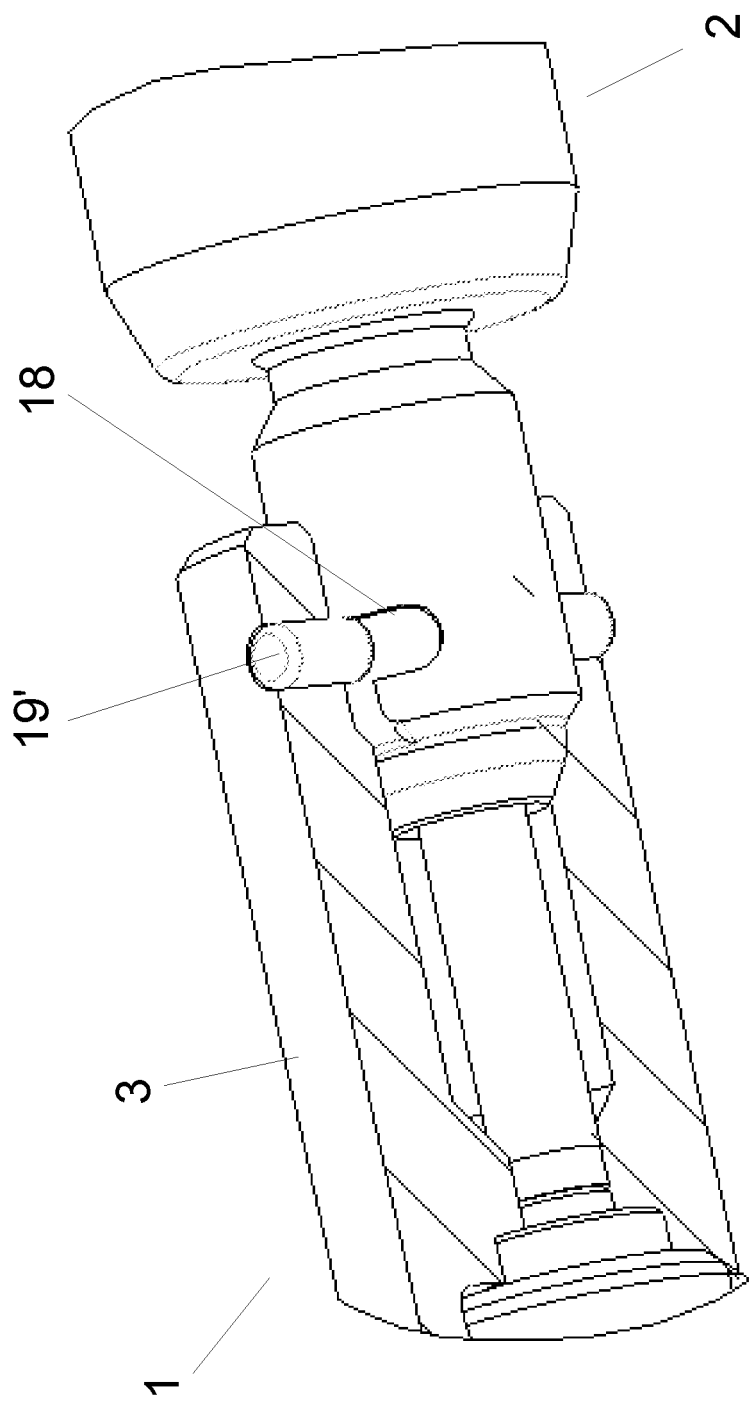
Figure 12C:
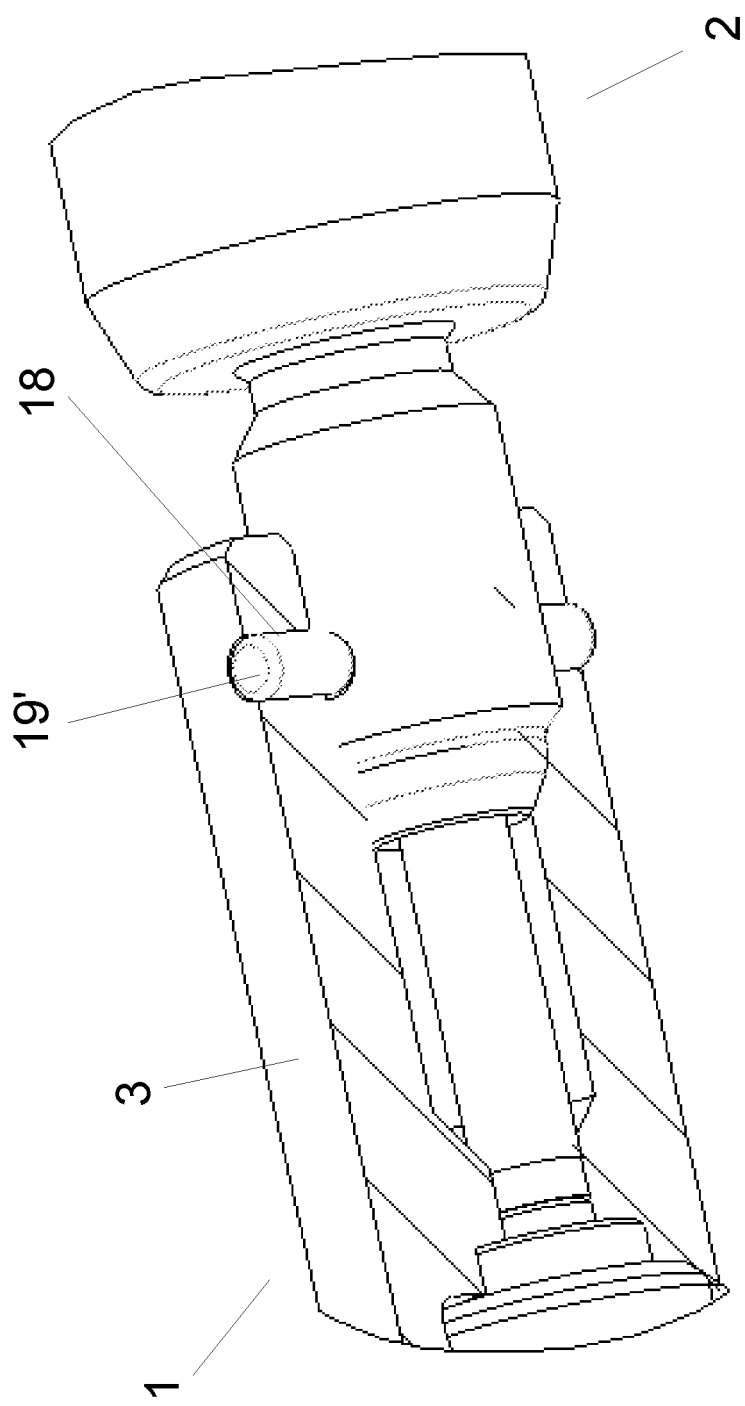

FIGS. 12a, 12b and 12c show an alternate embodiment of the capillary connection system according to the invention. The socket unit 1 and the plug unit 2 here can be connected using a bayonet connection. The housing 3 comprises at least one bayonet fit elements 19' (here, two bayonet fit elements). Bayonet fit elements 19' can comprise pins as shown in the figure, but can also comprise balls or other protruding elements adapted to be fitted with a bayonet cavity or cavities 18'. In the figure, the socket unit 1 comprises the bayonet fit elements 19' and the plug unit 2 comprises bayonet cavities 18', but a skilled person will understand that the reverse (i.e. the socket unit comprising bayonet cavities 18' and the plug unit 2 comprising bayonet fit elements 19') is also possible.

FIG. 12a shows the capillary fitting system in the disconnecting state, i.e. the bayonet fit elements 19' and the bayonet cavity 18' are not fit together and connected.

FIG. 12b shows an intermediate state where the socket unit 1 and the plug unit 2 are about to be connected or engaged through the bayonet fit elements 19' and the bayonet cavity, groove or recess 18'.

FIG. 12c shows a connection state where the socket unit 1 and the plug unit 2 have been firmly connected through the bayonet fit mechanism.

Figure 13:
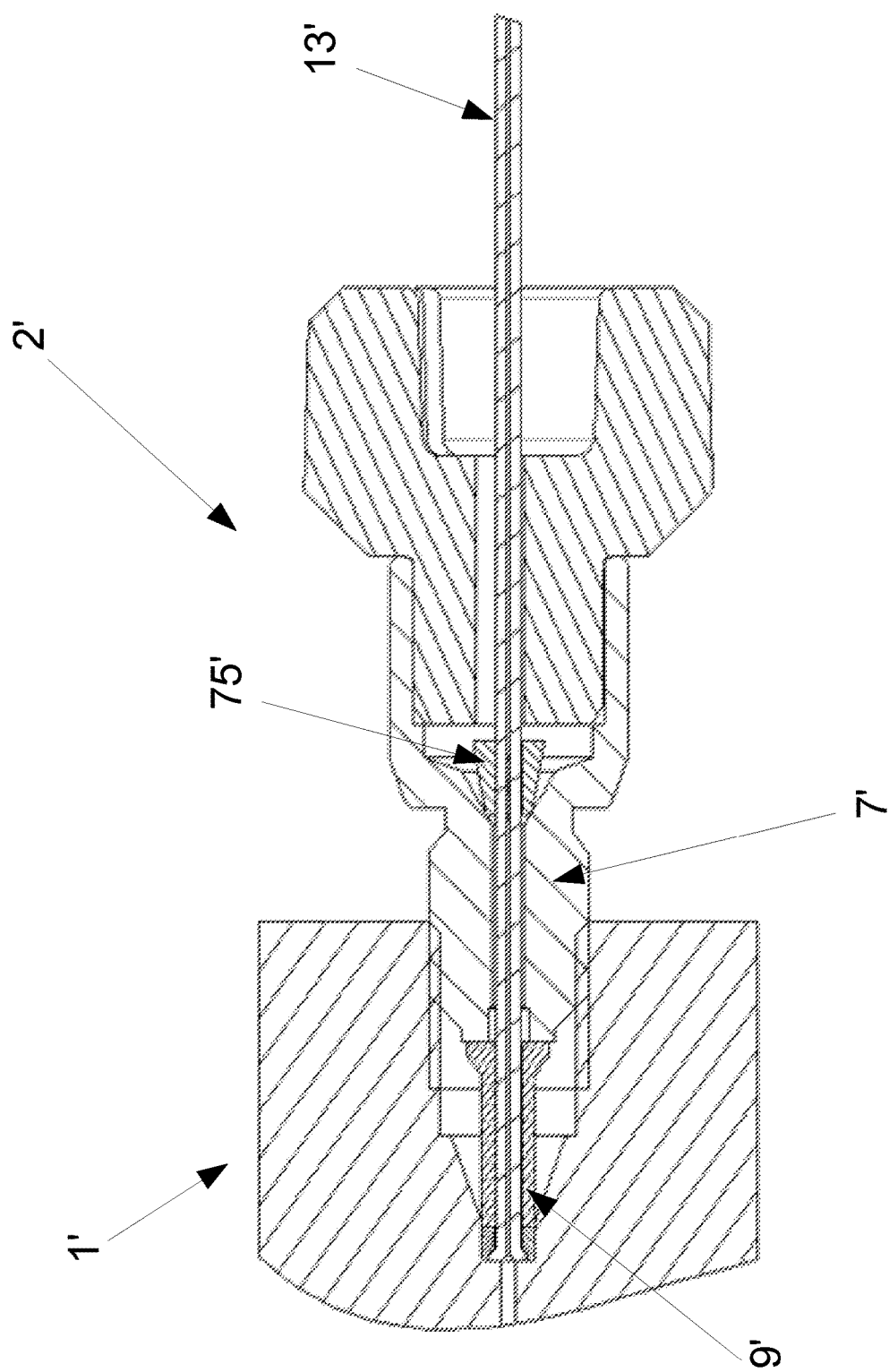
FIG. 13 depicts a previously known embodiment of a plug and socket system.

FIG. 13 shows a system of a socket unit 1 and plug unit 2 according to a previously known embodiment. The gripping element 7 has no curved inwards end 71, and the pushing element 9 is simply attached to the capillary 13. A pull out ferrule 75 is placed around the capillary 13 behind the gripping element 7. The pull out ferrule 75 is adapted to pull the capillary 13 along with the pushing element 9 out of the socket unit 1 when the plug unit 2 is disconnected.

As used herein, including in the claims, singular forms of terms are to be construed as also including the plural form, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

What is claimed is:

1. A socket unit for a capillary connection system for HPLC, the socket unit comprising:
   a) a housing including a housing outer surface and a housing inner surface defining a housing axial cavity adapted to receive a sealing element of a plug unit;
   b) a socket connecting mechanism adapted to engage with a corresponding plug connecting mechanism of the plug unit to connect the plug unit and the socket unit together, wherein the socket connecting mechanism is adapted for a predetermined number of discrete connection states between the socket unit and the plug unit; and
   c) a sealing inlay piece forming a socket floor at an end of the housing axial cavity, the sealing inlay piece adapted to seal and fluidly connect a capillary of the plug unit to another element.

2. The socket unit according to claim 1, wherein the socket connecting mechanism includes a snap fit connecting mechanism.

3. The socket unit according to claim 1, wherein the socket connecting mechanism includes a bayonet connecting mechanism.

4. The socket unit according to claim 1, wherein the socket connecting mechanism comprises at least one socket connecting element, wherein each of the at least one socket connecting element includes:
   a socket indentation comprising at least one hole in the housing from the housing outer surface to the housing inner surface, the at least one hole having an inner diameter, in which the inner diameter narrows from the housing outer surface towards the housing inner surface; and
   a snapping element adapted to fit into the socket indentation from the housing outer surface.

5. The socket unit according to claim 4, wherein the socket connecting mechanism further comprises:
   at least one holding element adapted to fix the snapping element within the socket indentation on the housing from a side of the housing outer surface.

6. The socket unit according to claim 4 further comprises a sealing surface adapted to seal a front end of a capillary, the sealing surface being perpendicular to a longitudinal axis of the socket unit and wherein the sealing surface is longitudinally displaced from the at least one socket connecting element by a distance in a range of 5 mm to 15 mm.

7. The socket unit according to claim 6, wherein the distance is in the range of 7 mm to 13 mm.

8. The socket unit according to claim 7, wherein the distance is in the range of 9 mm to 10 mm.

9. The socket unit according to claim 1, wherein the sealing inlay piece is adapted to be fitted to the housing, wherein the sealing inlay piece is adapted to fit around the capillary to form a tight and secure seal, wherein the sealing inlay piece comprises an inlay cavity through the sealing inlay piece adapted to serve as a passage for fluid flow.

10. The socket unit according to claim 1 further comprises: a sealing inlay piece, wherein the sealing inlay piece is adapted to be fitted to the housing and to connect a capillary to another apparatus, wherein the sealing inlay piece is adapted to fit flat against a face side of the capillary to form a tight and secure seal, wherein the sealing inlay piece comprises an inlay cavity through the sealing inlay piece adapted to serve as a passage for fluid flow.

11. The socket unit according to claim 1, wherein the socket connecting mechanism comprises at least one bayonet fit element, wherein each of the at least one bayonet fit element is configured to be fitted with a bayonet cavity of the plug unit.

12. The socket unit according to claim 11, wherein the bayonet fit element comprises an element selected from a group consisting of a pin, a ball, and a protruding element.

13. The socket unit according to claim 1, wherein the socket connecting mechanism comprises at least one bayonet cavity, wherein each of the at least one bayonet cavity is configured to be fitted with a bayonet fit element of the plug unit.

14. The socket unit according to claim 13, wherein the bayonet cavity has a L shape.

15. A plug unit for a capillary connection system for HPLC, the plug unit comprising:
   a) a capillary;
   b) a gripping element including a plug connecting mechanism adapted to engage with a corresponding socket connecting mechanism of a socket unit to connect the plug unit and the socket unit together,
   wherein the plug connecting mechanism is adapted for a predetermined number of discrete connection states between the socket unit and the plug unit; and
   c) a pushing element fixed to the capillary and adapted to transmit an axial sealing force from the gripping element to the capillary,
   wherein the gripping element grips the pushing element to allow axial motion between the gripping and pushing elements without disconnecting the gripping and pushing elements.

16. The plug unit according to the claim 15, wherein the plug connecting mechanism is a snap fit connecting mechanism.

17. The plug unit according to the claim 15, wherein the plug connecting mechanism is a bayonet connecting mechanism.

18. The plug unit according to the claim 15, wherein the plug connecting mechanism comprises at least one plug connecting element and wherein the plug connecting element is a plug indentation around an outer circumference of the gripping element.

19. The plug unit according to the claim 15, wherein the plug connecting mechanism comprises a bayonet mount located on the gripping element and adapted to connect with the socket connecting mechanism.

20. The plug unit according to the claim 15, wherein the gripping element comprises a forward curved inward end wherein the forward curved inward end is bent in on itself towards an axial cavity of the gripping element and defines an end cavity in the gripping element within which the pushing member moveably extends.

21. The plug unit according to the claim 20, wherein the pushing element further comprises at least one shoulder adapted to fit within the end cavity of the gripping element and to engage with the forward curved inward end of the gripping element, wherein an engagement between the forward curved inward end of the gripping element and the at least one shoulder of the pushing element is adapted to withstand a separating force of 100 N.

22. The plug unit according to the claim 21, wherein the at least one shoulder of the pushing element is adapted to withstand the separating force of 500 N.

23. The plug unit according to the claim 21, wherein the at least one shoulder of the pushing element is adapted to withstand the separating force of 1000 N.

24. The plug unit according to claim 18 further comprising: a forward end and wherein the forward end is longitudinally displaced from the at least one plug connecting element by a distance in a range of 5 mm to 15 mm.

25. The plug unit according to claim 24, wherein the distance is in the range of 7 mm to 13 mm.

26. The plug unit according to claim 24, wherein the distance is in the range of 9 mm to 10 mm.

27. The plug unit according to claim 15, wherein the plug connecting mechanism comprises at least one bayonet fit element, wherein each of the at least one bayonet fit element is configured to be fitted with a bayonet cavity of the socket unit.

28. The plug unit according to claim 27, wherein the bayonet fit element comprises an element selected from a group consisting of a pin, a ball, and a protruding element.

29. The plug unit according to claim 15, wherein the plug connecting mechanism comprises at least one bayonet cavity, wherein each of the at least one bayonet cavity is configured to be fitted with a bayonet fit element of the socket unit.

30. The plug unit according to claim 29, wherein the bayonet cavity has a L shape.

31. A system for connecting a capillary, the system comprising:
   a) a socket unit including:
      i) a housing including a housing outer surface and a housing inner surface defining a housing axial cavity adapted to receive a sealing element of a plug unit;
      ii) a socket connecting mechanism adapted to engage with a corresponding plug connecting mechanism of the plug unit to connect the plug unit and the socket unit together; and
      iii) a sealing inlay piece forming a socket floor at an end of the housing axial cavity, the sealing inlay piece adapted to seal and fluidly connect a capillary of the plug unit to another element,
   b) the plug unit including:
      i) the capillary; and
      ii) a gripping element including the corresponding plug connecting mechanism adapted to engage with the socket connecting mechanism of the socket unit to connect the plug unit and the socket unit together,
   wherein the socket connecting mechanism and the plug connecting mechanism are adapted for a predetermined number of discrete connection states between the socket unit and the plug unit, and the plug unit and the socket unit are adapted to withstand a disconnecting force of 3 N in the connection state.

32. The system in accordance with claim 31, wherein the plug unit and the socket unit are adapted to withstand the disconnecting force of 9 N in the connection state.

33. The system in accordance with claim 31, wherein in the connection state, the plug unit and the socket unit are adapted to separate when the disconnecting force of 50 N is applied.

34. The system in accordance with claim 31, wherein in the connection state, the plug unit and the socket unit are adapted to separate when the disconnecting force of 10 N is applied.

35. The system according to claim 31, wherein the socket connecting mechanism comprises at least one socket connecting element, wherein each of the at least one socket connecting element includes:
   a socket indentation comprising at least one hole in the housing from the housing outer surface to the housing inner surface, the at least one hole having an inner diameter, in which the inner diameter narrows from the housing outer surface towards the housing inner surface; and
   a snapping element adapted to fit into the socket indentation from the housing outer surface.

36. The system according to claim 35, wherein the socket connecting mechanism further comprises:
   at least one holding element adapted to fix the snapping element within the socket indentation on the housing from a side of the housing outer surface.

37. The system according to claim 35 further comprises a sealing surface adapted to seal a front end of a capillary, the sealing surface being perpendicular to a longitudinal axis of the socket unit and wherein the sealing surface is longitudinally displaced from the at least one socket connecting element by a distance in a range of 5 mm to 15 mm.

38. The system according to claim 31, wherein the sealing inlay piece is adapted to be fitted to the housing, wherein the sealing inlay piece is adapted to fit around the capillary to form a tight and secure seal, wherein the sealing inlay piece comprises an inlay cavity through the sealing inlay piece adapted to serve as a passage for fluid flow.

39. The system according to claim 31 further comprises:
   a sealing inlay piece, wherein the sealing inlay piece is adapted to be fitted to the housing and to connect the capillary to another apparatus, wherein the sealing inlay piece is adapted to fit flat against a face side of the capillary to form a tight and secure seal, wherein the sealing inlay piece comprises an inlay cavity through the sealing inlay piece adapted to serve as a passage for fluid flow.

40. The system according to claim 31, wherein the socket connecting mechanism comprises at least one bayonet fit element, wherein the plug connecting mechanism comprises at least one bayonet cavity, wherein each of the at least one bayonet fit element is configured to be fitted with each of the at least one bayonet cavity.

41. The system according to claim 31, wherein the socket connecting mechanism comprises at least one bayonet cavity, wherein the plug connecting mechanism comprises at least one bayonet fit element, wherein each of the at least one bayonet fit element is configured to be fitted with each of the at least one bayonet cavity.

42. The system according to claim 40, wherein the bayonet cavity has a L shape.

43. The system according to claim 40, wherein the bayonet fit element comprises an element selected from a group consisting of a pin, a ball, and a protruding element.

44. The system according to claim 41, wherein the bayonet cavity has a L shape.

45. The system according to claim 41, wherein the bayonet fit element comprises an element selected from a group consisting of a pin, a ball, and a protruding element.

46. A capillary connection system comprising:
   a plug unit including:
      a capillary;
      a gripping element including a plug connecting mechanism adapted to engage with a corresponding socket connecting mechanism of a socket unit to releasably connect the plug and socket units together; and
      a pushing element fixed to the capillary and axially movable relative to the gripping element; and
      a biasing element between the pushing element and the gripping element, wherein the biasing element directs the pushing element toward the socket unit;

the socket unit including:
- a housing including an axial cavity adapted to receive the capillary of the plug unit, the housing supporting the socket connecting mechanism;
- wherein the biasing element extends within the axial cavity; and
- wherein the socket connecting mechanism and the plug connecting mechanism are adapted for a predetermined number of discrete connection states between the socket unit and the plug unit.

47. The capillary connection system according to claim 46, wherein the gripping element grips the pushing element to allow axial motion between the gripping and pushing elements without disconnecting.

48. The capillary connection system according to claim 46, further comprising a sealing inlay piece located at an end of the housing axial cavity adapted to seal and fluidly connect the capillary to another element.

* * * * *